US012674919B2

(12) United States Patent　　　　　　(10) Patent No.:　US 12,674,919 B2
Akimoto　　　　　　　　　　　　　　　　(45) Date of Patent:　　**\*Jul. 7, 2026**

(54) IMAGE-FORMING ELEMENT AND IMAGE DISPLAY DEVICE

(71) Applicant: NICHIA CORPORATION, Anan (JP)

(72) Inventor: Hajime Akimoto, Anan (JP)

(73) Assignee: NICHIA CORPORATION, Anan (JP)

( * ) Notice: Subject to any disclaimer, the term of this patent is extended or adjusted under 35 U.S.C. 154(b) by 385 days.

This patent is subject to a terminal disclaimer.

(21) Appl. No.: 18/392,314

(22) Filed: Dec. 21, 2023

(65) Prior Publication Data

US 2024/0125985 A1　　Apr. 18, 2024

Related U.S. Application Data

(63) Continuation of application No. PCT/JP2022/012835, filed on Mar. 18, 2022.

(30) Foreign Application Priority Data

Jun. 30, 2021　　(JP) ................................. 2021-108874

(51) Int. Cl.
　　*G02B 5/124*　　　　(2006.01)
　　*G02B 30/56*　　　　(2020.01)
(52) U.S. Cl.
　　CPC ............. *G02B 5/124* (2013.01); *G02B 30/56* (2020.01)
(58) Field of Classification Search
　　CPC ................................. G02B 5/124; G02B 30/56
　　See application file for complete search history.

(56) References Cited

U.S. PATENT DOCUMENTS

| 11,892,572 B1 | 2/2024 | Dunphy et al. |
| 12,025,798 B1 | 7/2024 | Dehkordi et al. |
| 2010/0110384 A1 | 5/2010 | Maekawa |

(Continued)

FOREIGN PATENT DOCUMENTS

| JP | 2009-042337 A | 2/2009 |
| JP | 2013-238681 A | 11/2013 |

(Continued)

OTHER PUBLICATIONS

Non-Final Office Action on U.S. Appl. No. 18/504,237 dated Dec. 16, 2025.

(Continued)

*Primary Examiner* — Wen Huang
(74) *Attorney, Agent, or Firm* — Foley & Lardner LLP

(57)　　　　　　　ABSTRACT

An image-forming element includes a base member including a first surface, and a second surface opposite the first surface; and a reflector array located on the base member. The reflector array comprises a plurality of reflector rows, each including a plurality of dihedral corner reflectors arranged along a first direction. The plurality of reflector rows are arranged in a second direction crossing the first direction, the plurality of reflector rows being parallel to each other with a spacing therebetween. Each of the plurality of dihedral corner reflectors includes: a first reflecting surface configured to reflect light from a first surface side, and a second reflecting surface orthogonal to the first reflecting surface and configured to reflect a reflected light from the first reflecting surface toward the first surface side.

12 Claims, 25 Drawing Sheets

(56)     References Cited

U.S. PATENT DOCUMENTS

| | | |
|---|---|---|
| 2011/0074657 A1 | 3/2011 | Sugiyama |
| 2011/0235201 A1 | 9/2011 | Maekawa |
| 2015/0279283 A1 | 10/2015 | Nakao |
| 2018/0081058 A1 | 3/2018 | Kalscheur |
| 2018/0101087 A1 | 4/2018 | Shinohara |
| 2018/0164596 A1 | 6/2018 | Houzyou et al. |
| 2018/0203244 A1 | 7/2018 | Hatanaka et al. |
| 2018/0267216 A1 | 9/2018 | Otsubo |
| 2019/0179160 A1 | 6/2019 | Ito et al. |
| 2019/0196020 A1 | 6/2019 | Aceti et al. |
| 2020/0290513 A1 | 9/2020 | Karafin et al. |
| 2021/0096393 A1 | 4/2021 | Daiku |
| 2021/0103161 A1 | 4/2021 | Daiku |
| 2021/0379993 A1 | 12/2021 | Xu et al. |
| 2022/0043277 A1 | 2/2022 | Karafin et al. |
| 2022/0155614 A1 | 5/2022 | Kikuta |
| 2022/0176869 A1 | 6/2022 | Maruyama |
| 2023/0035023 A1 | 2/2023 | Kikuta |
| 2023/0074490 A1* | 3/2023 | Keum .................... G02B 5/136 |
| 2023/0128022 A1 | 4/2023 | Weindorf et al. |
| 2024/0036353 A1 | 2/2024 | Krauthamer et al. |
| 2024/0184109 A1 | 6/2024 | Kitahara et al. |
| 2024/0210683 A1 | 6/2024 | Aruga et al. |
| 2024/0210684 A1 | 6/2024 | Kitahara et al. |
| 2024/0253465 A1 | 8/2024 | Shintani et al. |
| 2024/0355241 A1 | 10/2024 | Kawanishi et al. |
| 2024/0361611 A1 | 10/2024 | Daiku |
| 2024/0427169 A1 | 12/2024 | Daiku |

FOREIGN PATENT DOCUMENTS

| | | | |
|---|---|---|---|
| JP | 2015-146009 | A | 8/2015 |
| JP | 2017-156466 | A | 9/2017 |
| JP | 2017-156467 | A | 9/2017 |
| JP | 2017-156468 | A | 9/2017 |
| WO | WO-2016/199902 | A1 | 12/2016 |
| WO | WO-2017/018204 | A1 | 2/2017 |
| WO | WO-2017/051598 | A1 | 3/2017 |
| WO | WO-2017/146172 | A1 | 8/2017 |

OTHER PUBLICATIONS

Non-Final Office Action in U.S. Appl. No. 18/508,974 dated Jan. 27, 2026.

U.S. Appl. No. 18/493,167, filed Oct. 24, 2023, Akimoto et al.

U.S. Appl. No. 18/504,237, filed Nov. 8, 2023, Akimoto et al.

U.S. Appl. No. 18/508,974, filed Nov. 14, 2023, Akimoto et al.

U.S. Appl. No. 18/520,041, filed Nov. 27, 2023, Akimoto et al.

U.S. Appl. No. 18/526,318, filed Dec. 1, 2023, Akimoto et al.

U.S. Appl. No. 18/390,715, filed Dec. 20, 2023, Akimoto et al.

International Search Report and Written Opinion of the International Searching Authority issued in the corresponding International Patent Application No. PCT/JP2022/012835, dated May 17, 2022.

U.S. Appl. No. 18/392,314, filed Dec. 21, 2023, Hajime Akimoto.

U.S. Appl. No. 18/741,019, filed Jun. 12, 2024, Hajime Akimoto.

Notice of Allowance on U.S. Appl. No. 18/520,041 dated Apr. 9, 2025.

Non-Final Office Action in U.S. Appl. No. 18/390,715 dated May 30, 2025.

Non-Final Office Action in U.S. Appl. No. 18/741,019 dated Apr. 8, 2026.

* cited by examiner

IMAGE-FORMING ELEMENT AND IMAGE DISPLAY DEVICE

CROSS-REFERENCE TO RELATED APPLICATIONS

The present application is a bypass continuation of PCT Application No. PCT/JP2022/012835, filed Mar. 18, 2022, which claims priority to Japanese Application No. 2021-108874, filed Jun. 30, 2021. The contents of these applications are hereby incorporated by reference in their entireties.

BACKGROUND

Embodiments of the invention relate to an image-forming element and an image display device.

A reflective image-forming optical element that displays a real image of an object to be observed in mid-air and an image display device in which the reflective image-forming optical element is applied have been proposed. See, e.g., JP 2015-146009 A ("Patent Literature 1").

Such an image display device can display an image when needed by a user, and not display the image at other times. In addition, because the image is displayed in mid-air, a device for the display part is unnecessary, therefore providing advantages such as more effective utilization of the limited space inside an automobile or the like.

Also, applications of technology capable of displaying images in mid-air are expected to realize non-contact operation panels as a precaution against infectious diseases, thereby expanding the field of application beyond utilization in automobiles and the like.

Such reflective image-forming optical elements that have been put into practical use include those that use dihedral corner reflectors and those that use retroreflective function optical elements called corner cube reflectors. See, e.g., WO 2016/199902 A ("Patent Literature 2"). Attention has been called to problems resulting from the operation principles of each. For example, in an image-forming element using dihedral corner reflectors, it is said to be difficult to avoid the display of false images at locations unintended by the user. Also, in an image-forming element using corner cube reflectors, attention has been called to the device structure being larger and more complex.

An image-forming element and an image display device having simple structures that do not easily display false images are desirable.

SUMMARY

An embodiment of the invention provides an image-forming element and an image display device having simple structures that do not easily display false images.

An image-forming element according to an embodiment of the invention includes a base member, and a reflector array located at the base member; the base member includes a first surface, and a second surface positioned at a side opposite to the first surface. The reflector array includes multiple reflector rows that include multiple dihedral corner reflectors arranged along a first direction. The multiple reflector rows are arranged in a second direction to be parallel to each other with a spacing interposed; and the second direction crosses the first direction. Each of the multiple dihedral corner reflectors includes a first reflecting surface and a second reflecting surface; the first reflecting surface is arranged to reflect light from the first surface side; and the second reflecting surface is arranged to be orthogonal to the first reflecting surface and arranged to reflect a reflected light from the first reflecting surface toward the first surface side. In each of the multiple reflector rows, an angle between a straight line and a virtual plane is set to a value greater than 0° and less than 90°; the first and second reflecting surfaces cross at the straight line; the virtual plane includes the first and second directions; and an angle between the first reflecting surface and the virtual plane is set to a value greater than 45° and less than 90°. The multiple reflector rows include a first reflector row of which the angle between the straight line and the virtual plane is set to a smallest value among the multiple reflector rows. The angle between the straight line and the virtual plane is set to values that increase away from the first reflector row in one direction along the second direction for remaining reflector rows among the multiple reflector rows.

An image display device according to an embodiment of the invention includes an image-forming element, and a light source irradiating light on the image-forming element. The image-forming element includes a base member, and a reflector array located at the base member; and the base member includes a first surface, and a second surface positioned at a side opposite to the first surface. The reflector array includes multiple reflector rows that include multiple dihedral corner reflectors arranged along a first direction. The multiple reflector rows are arranged in a second direction to be parallel to each other with a spacing interposed; and the second direction crosses the first direction. Each of the multiple dihedral corner reflectors includes a first reflecting surface and a second reflecting surface; the first reflecting surface is arranged to reflect light from the first surface side; and the second reflecting surface is arranged to be orthogonal to the first reflecting surface and arranged to reflect a reflected light from the first reflecting surface toward the first surface side. In each of the multiple reflector rows, an angle between a straight line and a virtual plane is set to a value greater than 0° and less than 90°; the first and second reflecting surfaces cross at the straight line; the virtual plane includes the first and second directions; and an angle between the first reflecting surface and the virtual plane is set to a value greater than 45° and less than 90°. The multiple reflector rows include a first reflector row of which the angle between the straight line and the virtual plane is set to a smallest value among the multiple reflector rows. The angle between the straight line and the virtual plane is set to values that increase away from the first reflector row in one direction along the second direction for remaining reflector rows among the multiple reflector rows. The light source is located at the first surface side. Each of the multiple dihedral corner reflectors is arranged so that a portion of a reflected light emitted from the light source and once-reflected by the first reflecting surface travels toward the second reflecting surface, and so that another portion of the reflected light travels toward the second surface side.

DETAILED DESCRIPTION

Figure 1:
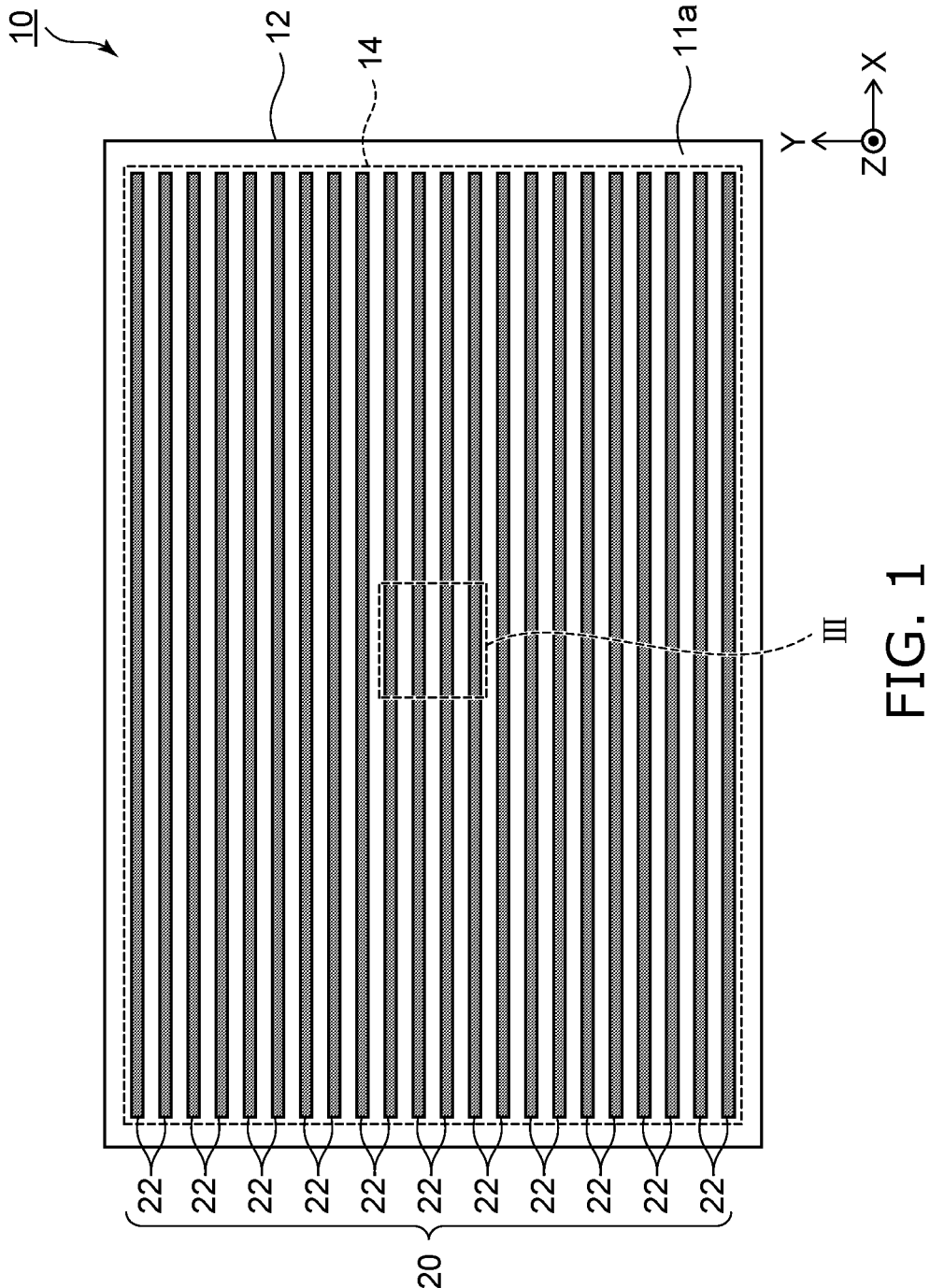
FIG. 1 is a schematic plan view illustrating an image-forming element according to a first embodiment.

Embodiments of the invention will now be described with reference to the drawings.

The drawings are schematic or conceptual, and the relationships between the thickness and width of portions, the proportions of sizes among portions, etc., are not necessarily the same as the actual values. Also, the dimensions and proportions may be illustrated differently among drawings, even when the same portion is illustrated.

In the specification and drawings, components similar to those described previously or illustrated in an antecedent drawing are marked with the same reference numerals, and a detailed description is omitted as appropriate.

First Embodiment

FIG. 1 is a schematic plan view illustrating an image-forming element according to the embodiment.

As shown in FIG. 1, the image-forming element 10 according to the embodiment includes a base member 12 and a reflector array 20. The base member 12 includes a first surface 11a, and the reflector array 20 is located on the first surface 11a. In the example, the reflector array 20 is located in a reflector formation region 14 of the first surface 11a. The reflector array 20 includes multiple reflector rows 22.

First, a configuration of the base member 12 will be described.

Figure 2:
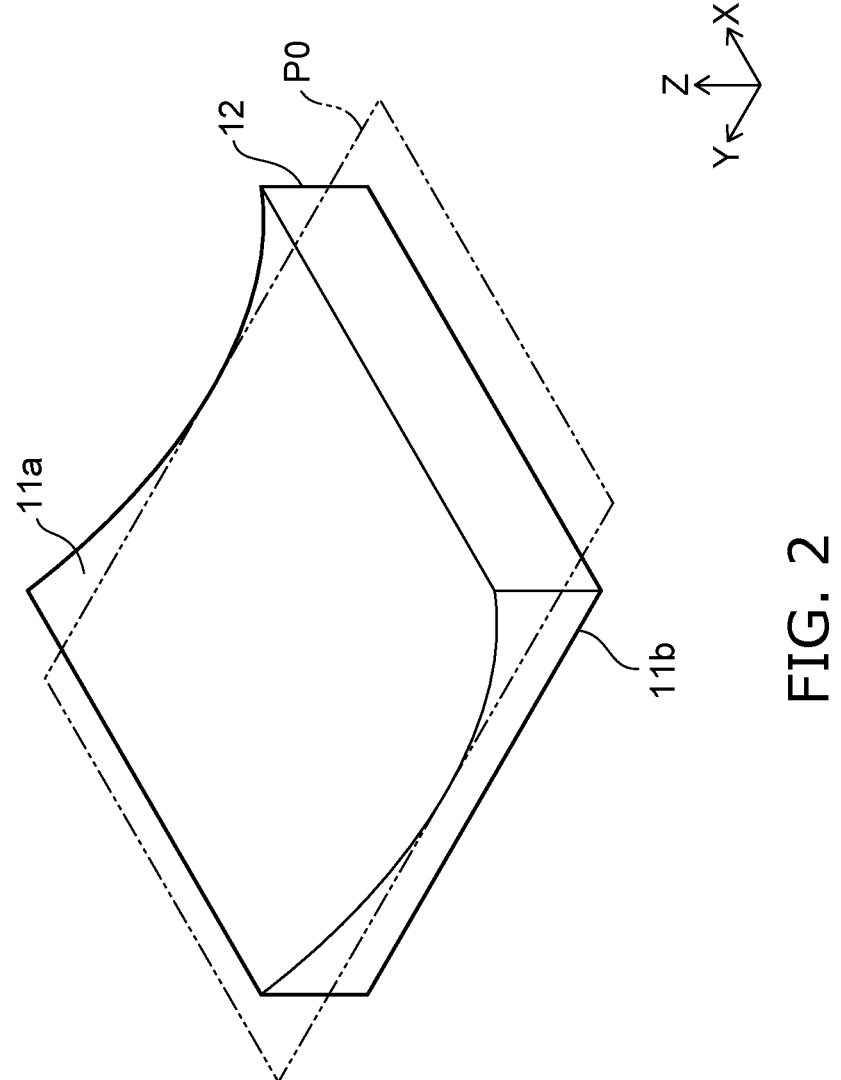
FIG. 2 is a schematic perspective view illustrating a portion of an image-forming element of the first embodiment.

FIG. 2 is a schematic perspective view illustrating a portion of the image-forming element of the embodiment.

As shown in FIG. 2, the base member 12 includes the first surface 11a and a second surface lib. The second surface 11b is located at the side opposite to the first surface 11a.

In the specification, the configurations of the image-forming element, the image display device, etc., may be described using an XYZ right-handed three-dimensional coordinate system. The XY-plane is defined as a plane parallel to a virtual plane P0. The first surface 11a is located further in the positive direction of the Z-axis than the second surface 11b. The first surface 11a includes a portion of a circular arc that is convex toward the negative Z-axis side when projected onto the YZ-plane. In specific examples described below, the virtual plane P0 is a virtual plane parallel to a tangent plane contacting the portion of the circular arc at a point positioned furthest in the negative direction of the Z-axis.

The first surface 11a is such a curved surface, and the reflector array 20 is located on the curved surface. The virtual plane P0 is used as a reference plane when setting the tilt in the Y-axis direction of the reflector row 22. In other words, the reflector row 22 is arranged on the first surface 11a at an angle set with respect to the virtual plane P0.

The base member 12 is formed of a light-transmitting material and is formed of, for example, a transparent resin.

In the image-forming element 10 of the embodiment, when the light source is located at the first surface 11a side when referenced to the base member 12, a floating image is formed not at the second surface 11b side, but at the first surface 11a side at which the light source is located. The position at which the floating image is formed can be a position that is different from the position at which the light source is located and sufficiently separated from the position at which the light source is located.

The description continues now by returning to FIG. 1.

The reflector row 22 extends along the X-axis direction. The multiple reflector rows 22 are arranged to be substantially parallel to each other along the Y-axis direction. The multiple reflector rows 22 are arranged at substantially uniform spacing in the Y-axis direction with spacing interposed respectively between the adjacent reflector rows 22. The spacing of the reflector rows 22 can be any length and can be, for example, about the length in the Y-axis direction of the reflector row 22. When the light source is located at the first surface 11a side, light rays that are not reflected by the reflector row 22, reflected light that is reflected only once by the reflector row 22, and the like are incident on the region in which the spacing of the reflector rows 22 is formed. Such light rays and the like do not contribute to the floating image; therefore, the ratio of the light rays incident on the image-forming element 10 that contribute to the floating image decreases as the spacing increases; therefore, the spacing is set to an appropriate length according to the efficiency of the reflecting surfaces, the dimensions of the dihedral corner reflector described below with reference to FIG. 3, etc. Each of the reflector rows 22 includes many dihedral corner reflectors connected in the X-axis direction and is therefore shown as being filled-in to avoid complexity in FIG. 1.

Figure 3:
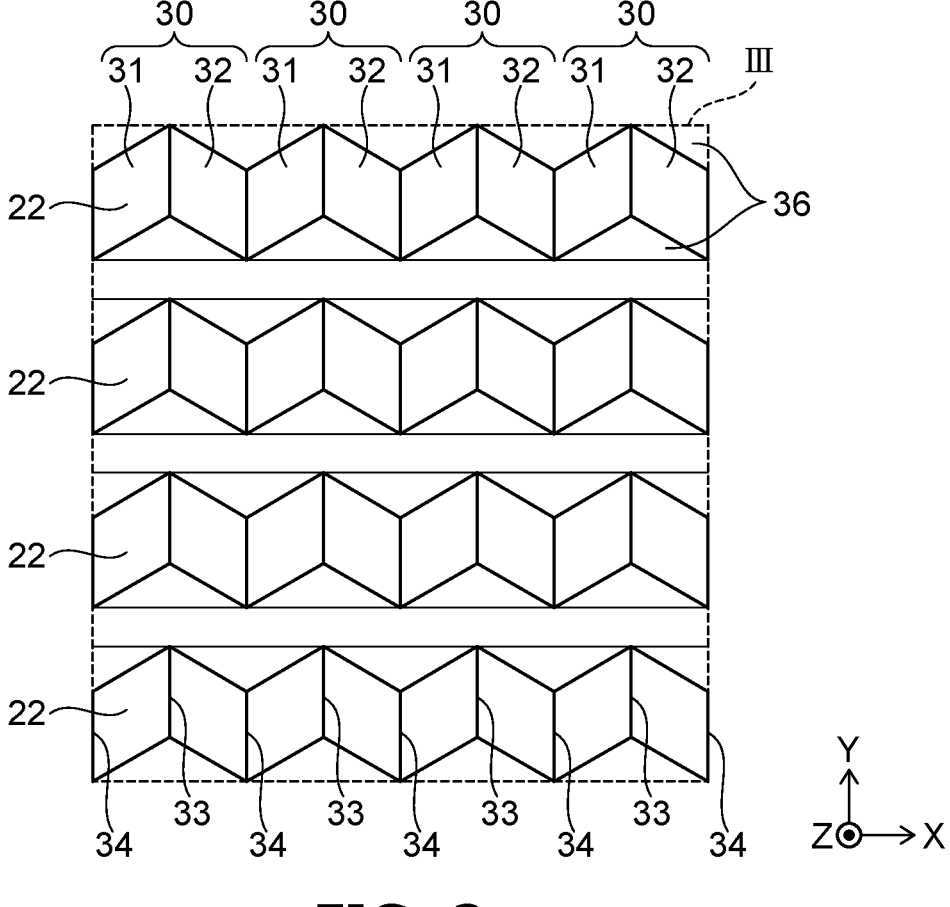
FIG. 3 is an enlarged schematic view of portion III of FIG. 1.

FIG. 3 is an enlarged schematic view of portion III of FIG. 1.

As shown in FIG. 3, the reflector row 22 includes multiple dihedral corner reflectors 30. The multiple dihedral corner reflectors 30 are connected to each other along the X-axis direction and are provided continuously. The dihedral corner reflector 30 includes a first reflecting surface 31 and a second reflecting surface 32. The dihedral corner reflector 30 is located on a base part 36 formed on the first surface 11a shown in FIG. 1. The first reflecting surface 31 and the second reflecting surface 32 each are substantially square when viewed in front-view, and the reflecting surfaces are connected to each other at one side of each of the squares so that the reflecting surfaces are substantially orthogonal.

Hereinbelow, the connecting line between the first reflecting surface 31 and the second reflecting surface 32 of the dihedral corner reflector 30 is called a valley-side connecting line 33. The side of the first reflecting surface 31 positioned at the side opposite to the valley-side connecting line 33 and the side of the second reflecting surface 32 positioned at the side opposite to the valley-side connecting line 33 each are called hill-side connecting lines 34.

The first reflecting surface 31 of the dihedral corner reflector 30 is connected at the hill-side connecting line 34 to the second reflecting surface 32 of the dihedral corner reflector 30 adjacent at the negative X-axis side. The second reflecting surface 32 of the dihedral corner reflector 30 is connected at the hill-side connecting line 34 to the first reflecting surface 31 of another dihedral corner reflector 30 adjacent at the positive X-axis side. Thus, the multiple dihedral corner reflectors 30 are connected to each other along the X-axis direction and are provided continuously.

In the image-forming element 10 of the embodiment, the dimensions of the first and second reflecting surfaces 31 and 32 can be, for example, several μm to several 100 μm. For example, the number of integrated dihedral corner reflectors 30 is set according to the size, resolution, and the like of the mid-air image to be displayed. For example, several tens to several thousand dihedral corner reflectors 30 are integrated in one image-forming element 10. For example, one thousand dihedral corner reflectors including 100 μm-square reflecting surfaces can be arranged over 20 cm in the Y-axis direction.

Figure 4A:
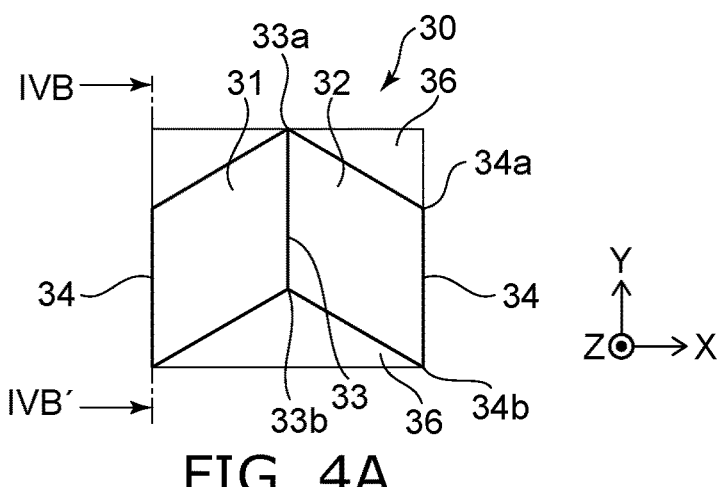
FIG. 4A is a schematic plan view illustrating a portion of the image-forming element of the first embodiment.

FIG. 4A is a schematic plan view illustrating a portion of the image-forming element of the embodiment.

Figure 4B:
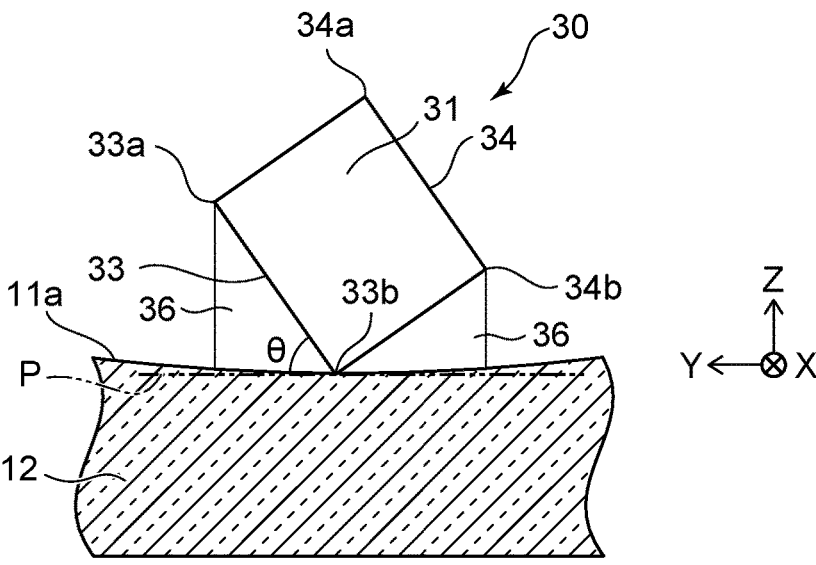
FIG. 4B is an example of a schematic auxiliary cross-sectional view along line IVB-IVB' of FIG. 4A.

FIG. 4B is an example of a schematic auxiliary cross-sectional view along line IVB-IVB' of FIG. 4A.

FIGS. 4A and 4B show a configuration of the dihedral corner reflector 30.

As shown in FIGS. 4A and 4B, the dihedral corner reflector 30 includes the first reflecting surface 31 and the second reflecting surface 32, and the first reflecting surface 31 and the second reflecting surface 32 are located on the base part 36. The base part 36 is arranged so that the first reflecting surface 31 and the second reflecting surface 32 have the desired angle with respect to a tangent plane P of the first surface 11a. The base part 36 is a light-transmitting member formed in a V-shape, is formed of, for example, a transparent resin, and is formed as a continuous body with the base member 12. The first reflecting surface 31 and the second reflecting surface 32 are formed by thin film formation of a light-reflective metal material or the like at the formation location of the V-shape of the base member. The formation is not limited to such an example; each or a portion of the first reflecting surface 31, the second reflecting surface 32, the base part 36, and the base member 12 may be formed separately, and assembled as one to form the image-forming element 10.

The first reflecting surface 31 and the second reflecting surface 32 are connected at the valley-side connecting line 33 to be substantially orthogonal. The hill-side connecting line 34 of the first reflecting surface 31 is positioned at the side opposite to the valley-side connecting line 33, and the hill-side connecting line 34 of the second reflecting surface 32 is positioned at the side opposite to the valley-side connecting line 33.

The end portions of the valley-side connecting line 33 are called vertices 33a and 33b. The position of the vertex 33a is further toward the positive Z-axis side than the position of the vertex 33b. That is, the vertex 33a is positioned to be more distant to the base member 12 than the vertex 33b. The end portions of the hill-side connecting line 34 are called vertices 34a and 34b. The position of the vertex 34a is further toward the positive Z-axis side than the position of the vertex 34b. That is, the vertex 34a is positioned to be more distant to the base member 12 than the vertex 34$b$. Accordingly, the vertex 34$a$ is positioned to be furthest from the base member 12, and the vertex 33$b$ is positioned to be most proximate to the base member 12.

FIG. 4B shows the relationship between the dihedral corner reflector 30, the first surface 11$a$, and the tangent plane P. The dihedral corner reflector 30 contacts the first surface 11$a$ at the vertex 33$b$ at the lower side of the valley-side connecting line 33. The tangent plane P is a plane that contacts the first surface 11$a$ at the position of the vertex 33$b$, and is a plane that is parallel to the virtual plane P0. The dihedral corner reflector 30 is arranged on the first surface 11$a$ so that the valley-side connecting line 33 forms an angle θ with the tangent plane P.

Figure 4C:
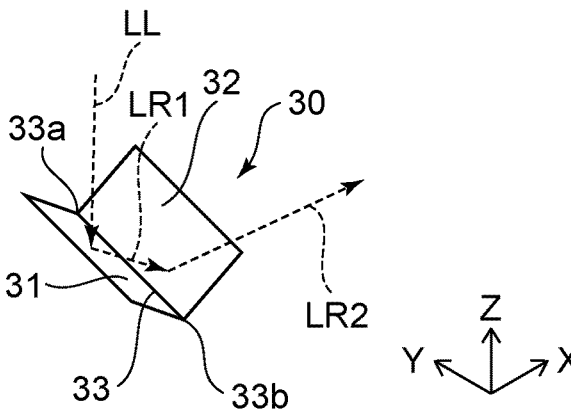
FIG. 4C is a schematic perspective view for describing an operation of the image-forming element of the first embodiment.

FIG. 4C is a schematic perspective view for describing an operation of the image-forming element of the embodiment.

As shown in FIG. 4C, when a light ray LL is incident on the first reflecting surface 31, the light ray LL is reflected by the first reflecting surface 31. A reflected light LR1 that is reflected by the first reflecting surface 31 is re-reflected by the second reflecting surface 32. A reflected light LR2 that is reflected by the second reflecting surface 32 is emitted toward the same side as the light source of the incident light. Thus, the dihedral corner reflector 30 emits the incident light from the first surface 11$a$ side toward a different position from the light source at the first surface 11$a$ side when referenced to the base member 12. Thus, the dihedral corner reflector 30 reflects the light twice by two reflecting surfaces, and reflects the twice-reflected light LR2 toward the side from which the incident light ray LL traveled. The reflection operation of the dihedral corner reflector 30 is reversible. Accordingly, when the light ray that is incident on the dihedral corner reflector 30 is incident along the opposite direction along the twice-reflected light LR2 in FIG. 4C, the light ray is reflected in the opposite direction along the incident light ray LL. Also, in the dihedral corner reflector 30, there are also cases where once-reflected light is not reflected twice as in the example but is reflected by one of the two reflecting surfaces and is emitted as-is.

As shown in FIGS. 3 and 4A, the dihedral corner reflector 30 is line-symmetric with respect to the valley-side connecting line 33, and is arranged so that the angle of the first reflecting surface 31 with respect to the tangent plane P is substantially equal to the angle of the second reflecting surface 32 with respect to the tangent plane P. Therefore, when the light ray is initially incident on the first reflecting surface 31, the dihedral corner reflector 30 emits the reflected light by an operation similar to when the light ray is initially incident on the second reflecting surface 32. For example, in FIG. 4C, the light ray LL is initially incident on the first reflecting surface 31 and reflected by the first reflecting surface 31; however, the operation of the dihedral corner reflector 30 can be similar to the description described above even when the light ray LL is initially incident on the second reflecting surface 32 and reflected by the second reflecting surface 32. Unless otherwise noted in the description of the operation of the image-forming element hereinbelow, the case where the light ray LL is initially reflected by the first reflecting surface 31 will be described.

Figure 5:
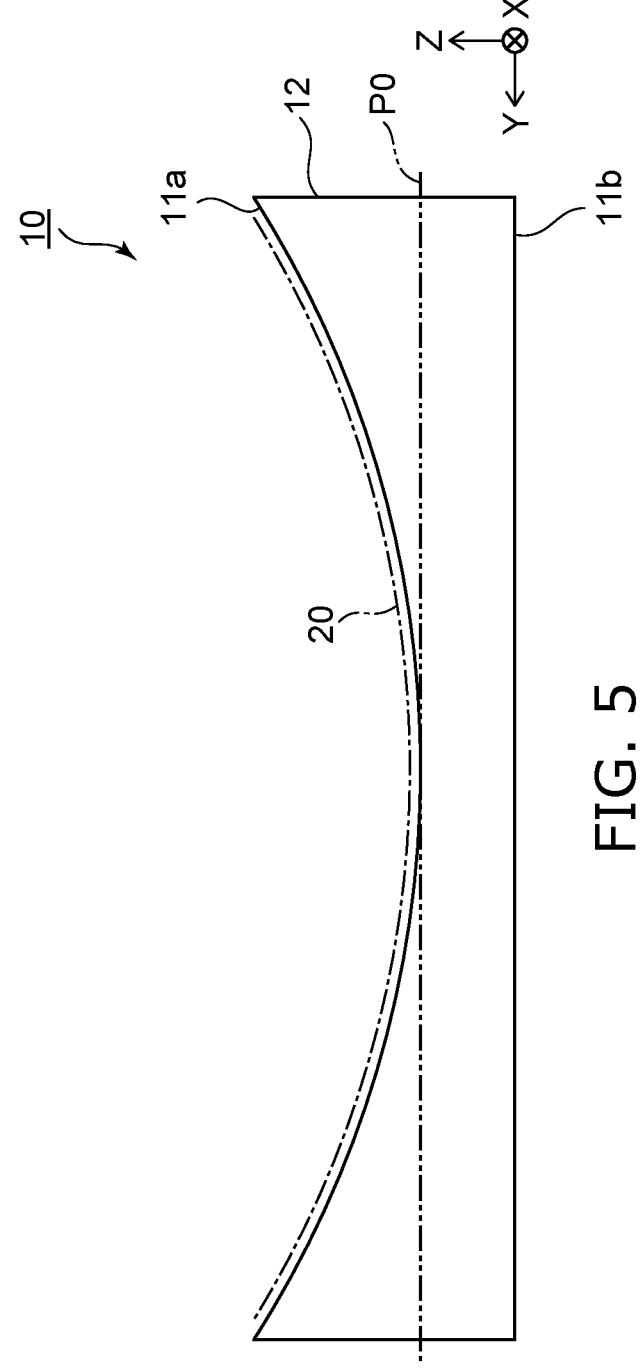
FIG. 5 is a schematic side view illustrating the image-forming element of the first embodiment.

FIG. 5 is a schematic side view illustrating the image-forming element of the embodiment.

In FIG. 5, the reflector array 20 is shown by an envelope connecting the vertices 33$a$ of the dihedral corner reflectors 30 shown in FIGS. 4A and 4B. In side views hereinbelow, the reflector array 20 is illustrated by illustrating the envelope of the vertices 33$a$ of the dihedral corner reflectors 30 as a single dot-dash line as shown in FIG. 5 unless it is necessary to show and describe the configuration of the dihedral corner reflector 30.

In the image-forming element 10 of the embodiment as shown in FIG. 5, the reflector array 20 is arranged in a curved shape because the first surface 11$a$ is a curved surface. The first surface 11$a$ includes a portion of a circular arc that is convex toward the negative Z-axis side when projected onto the YZ-plane; the reflector array 20 also is arranged in an arc-like shape, and the envelope of the vertices also is a circular arc. The radius of the circular arc is set based on the distance between the image-forming element 10 and the light source located at the first surface 11$a$ side of the image-forming element 10. For example, the radius of the circular arc of the reflector array 20 is set to about 2 times the distance between the image-forming element 10 and the light source.

According to the embodiment, the tangent plane that contacts the first surface 11$a$ at the lowest position at the negative Z-axis direction side is the virtual plane P0 that is parallel to the XY-plane.

Figure 6:
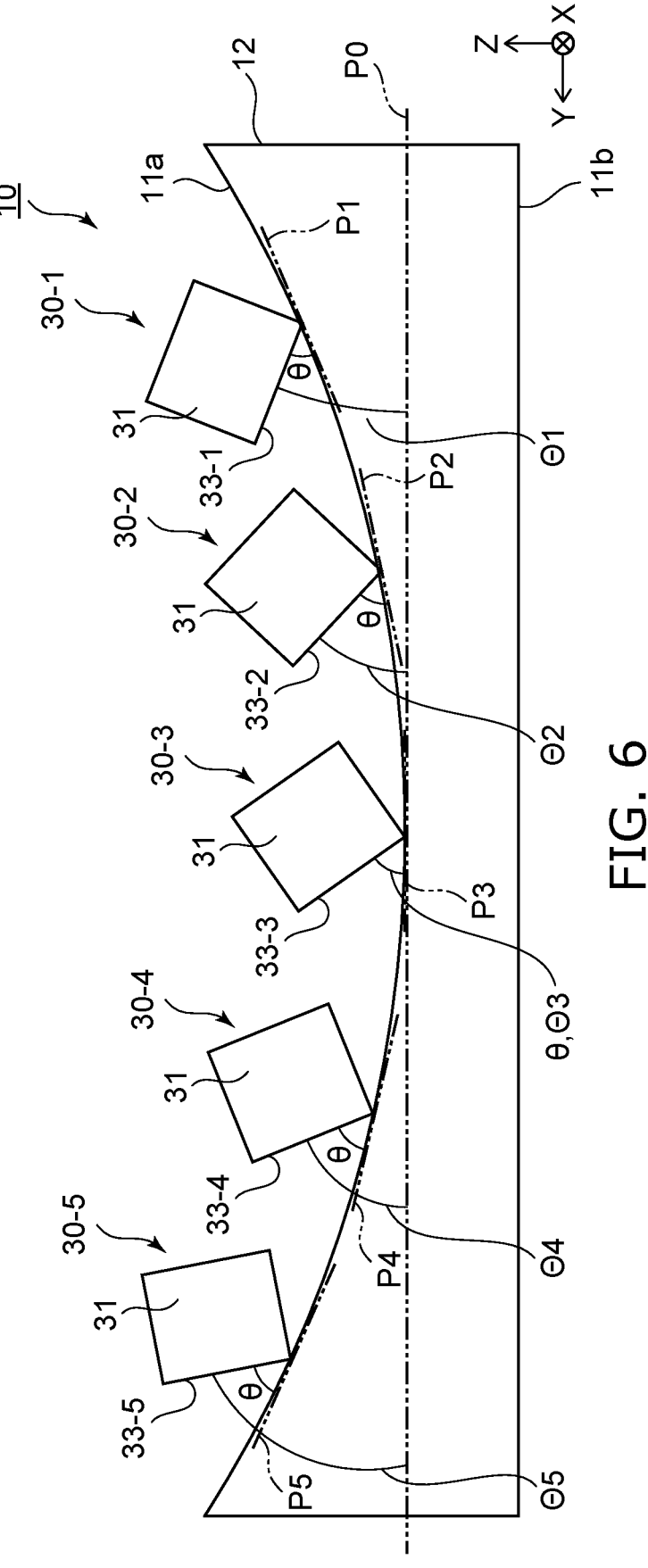
FIG. 6 is a schematic side view illustrating the image-forming element of the first embodiment.

FIG. 6 is a schematic side view illustrating the image-forming element of the embodiment.

FIG. 6 shows one dihedral corner reflector included in each of the multiple reflector rows 22 shown in FIGS. 1 and 3. As described with reference to FIGS. 1 and 3, the multiple reflector rows 22 each extend along the X-axis direction and are arranged at substantially uniform spacing in the Y-axis direction. The angles of the multiple dihedral corner reflectors included in one reflector row 22 with respect to the virtual plane P0 are substantially the same. Accordingly, the angle of the dihedral corner reflector 30 with respect to the virtual plane P0 refers to the angle with respect to the virtual plane P0 of the reflector row 22 to which the dihedral corner reflector 30 belongs.

FIG. 6 is an enlarged schematic illustration of five dihedral corner reflectors 30-1 to 30-5 among the many dihedral corner reflectors arranged in the Y-axis direction. Although different reference numerals are used to differentiate the positions in the Y-axis, the configurations of the dihedral corner reflectors 30-1 to 30-5 are the same as that of the dihedral corner reflector 30 described with reference to FIGS. 4A and 4B. The base part 36 shown in FIG. 4B is not illustrated to avoid complexity in the illustration.

As shown in FIG. 6, the dihedral corner reflectors 30-1 to 30-5 have different angles θ1 to 05 with respect to the virtual plane P0 according to the positions in the Y-axis along the first surface 11$a$. The angles Θ1 to Θ5 of the dihedral corner reflectors 30-1 to 30-5 are illustrated by the angles of the valley-side connecting lines (straight lines) 33-1 to 33-5 with respect to the virtual plane P0.

In the example, the dihedral corner reflectors 30-1 to 30-5 are arranged in this order in the positive direction of the Y-axis. The angles Θ1 to Θ5 of the dihedral corner reflectors 30-1 to 30-5 are set to increase in this order. That is, Θ1<Θ2<Θ3<Θ4<Θ5.

Restated more generally, when referenced to the reflector row (a first reflector row) 22 of the dihedral corner reflector set to the smallest value, the angles Θ1 to Θ5 of the dihedral corner reflectors 30-1 to 30-5 are set to values that increase away from the reflector row 22 in one direction along the Y-axis. Also, the angles Θ1 to Θ5 are set to values that decrease away from the reference reflector row 22 in the other direction along the Y-axis. In the example of FIG. 6, when the position of the dihedral corner reflector 30-1 set to the smallest angle is used as the reference, then Θ1<Θ2<Θ3<Θ4<Θ5 in the positive direction of the Y-axis.

The angles Θ1 to Θ5 of the dihedral corner reflector can be set so that 0°<Θ1 to Θ5<90°. Although the angles between the virtual plane P0 and the first reflecting surfaces 31 are determined conjunctively for the angles Θ1 to Θ5, 45°<(the angle between the first reflecting surface 31 and the virtual plane P0)<90° can be set. The angle between the second reflecting surface 32 and the virtual plane P0 is equal to the angle between the first reflecting surface 31 and the virtual plane P0. Accordingly, 45° <(the angle between the second reflecting surface 32 and the virtual plane P0)<90°.

The tilts of the dihedral corner reflectors 30-1 to 30-5 also may be set using the angles with respect to tangent planes P1 to P5 of the first surface 11a at which the dihedral corner reflectors 30-1 to 30-5 are located. The angles of the dihedral corner reflectors 30-1 to 30-5 with respect to the tangent planes P1 to P5 are set to a constant angle θ regardless of the positions of the dihedral corner reflectors 30-1 to 30-5 in the Y-axis. For example, the angle θ is based on the angle between the horizontal plane and each reflecting surface of a corner cube reflector and is set to about 30°, and more specifically, 35.3°.

In the image-forming element 10 of the embodiment, when referenced to the base member 12, the angles η1 to Θ5 of the dihedral corner reflectors 30-1 to 30-5 are appropriately set so that the light rays incident from the light source located at the first surface 11a side form a floating image at the first surface 11a side. The floating image formation position is at a different mid-air position from the light source. The angles of the dihedral corner reflectors with respect to the virtual plane P0 are determined by, for example, experiments, simulations, etc.

The angles of the dihedral corner reflectors with respect to the virtual plane P0 are set to increase according to the position in the Y-axis, or are set to decrease according to the position in the Y-axis; therefore, the first surface 11a may not be a portion of a circular arc of a perfect circle. For example, the first surface 11a may be a portion of an arc of an ellipse, or may be a portion of a polygon corresponding to the number of reflector rows. Also, it is sufficient to be able to set the angles of the dihedral corner reflectors according to the positions of the dihedral corner reflectors in the Y-axis; therefore, the angles of the dihedral corner reflectors may be referenced to another plane having any angle with respect to the virtual plane P0 without using the virtual plane P0 as a reference.

(First Modification)

Figure 7:
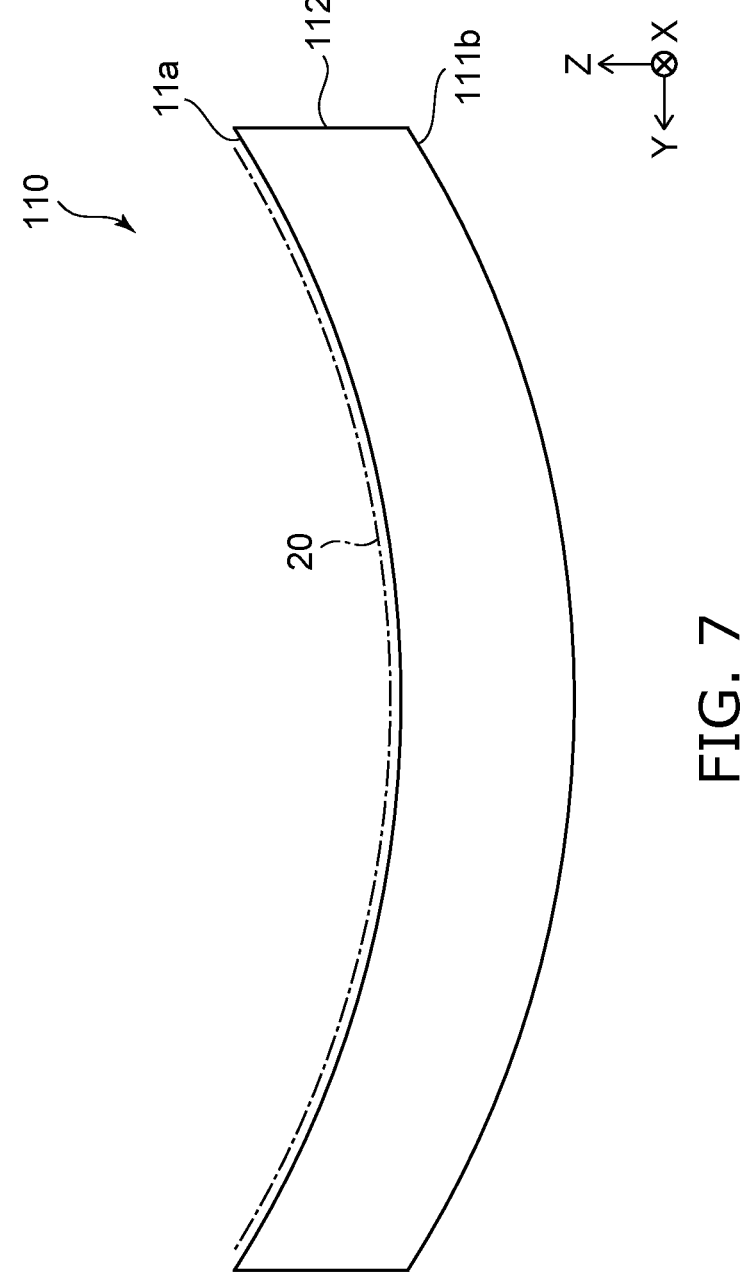
FIG. 7 is a schematic side view illustrating an image-forming element according to a first modification of the first embodiment.

FIG. 7 is a schematic side view illustrating an image-forming element according to the modification.

The configuration of a base member 112 of the modification is different from that of the first embodiment described above. Otherwise, the configuration of the base member 112 is the same as that of the first embodiment, the same components are marked with the same reference numerals, and a detailed description is omitted as appropriate.

As shown in FIG. 7, the image-forming element 110 of the modification includes the reflector array 20 and the base member 112. The base member 112 includes the first surface 11a and a second surface 111b. The reflector array 20 is located on the first surface 11a. The second surface 111b is located at a position at the side opposite to the first surface 11a. According to the modification, the second surface 111b has the same shape as the first surface 11a, and the first surface 11a and the second surface 111b both include portions of circular arcs having the same radius when projected onto the YZ-plane. In the example, the shape of the second surface 111b when projected onto the YZ-plane is not limited to the same shape as the first surface 11a when projected onto the YZ-plane, and may be any different shape.

Similarly to the first embodiment, the base member 112 is formed of a light-transmitting material, and is formed of, for example, a transparent resin.

In the reflector array 20, it is sufficient to set the angles of the dihedral corner reflectors with respect to the virtual plane P0 and the angles of the dihedral corner reflectors with respect to the tangent plane of the first surface 11a similarly to those of the first embodiment. Accordingly, the shape of the second surface 111b of the base member 112 can be arbitrary. For example, the storage space can be reduced, etc., by setting the shape to be suited to the location at which the image-forming element 110 is housed.

(Second Modification)

Figure 8A:
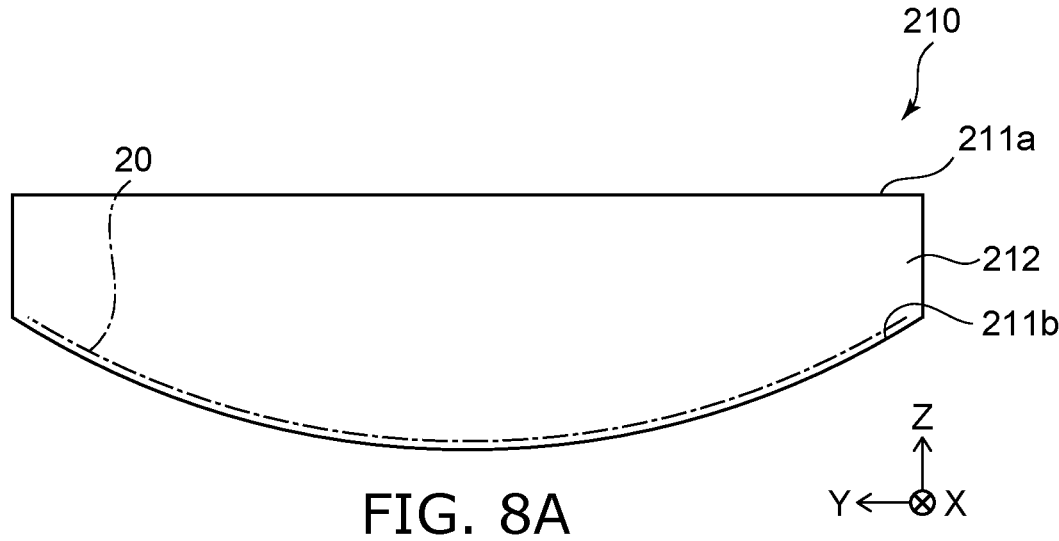
FIG. 8A is a schematic side view illustrating an image-forming element according to a second modification of the first embodiment.
Figure 8B:
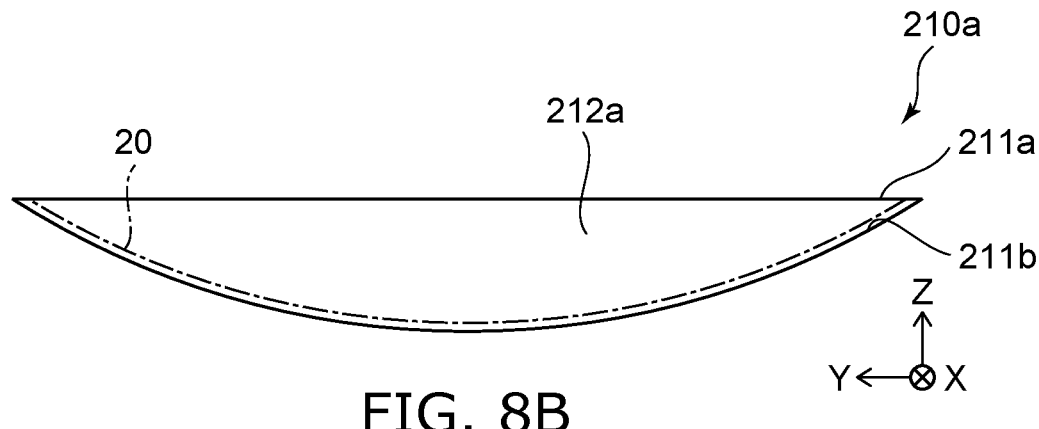
FIG. 8B is a schematic side view illustrating an image-forming element according to the second modification of the first embodiment.

FIGS. 8A and 8B are schematic side views illustrating image-forming elements according to the modification.

The configuration of a base member 212 of the modification is different from those of the first embodiment and the first modification described above. The location at which the reflector array 20 is located according to the modification is different from those of the first embodiment and the first modification. Otherwise, the configuration is the same as that of the first embodiment, the same components are marked with the same reference numerals, and a detailed description is omitted.

As shown in FIG. 8A, an image-forming element 210 includes the reflector array 20 and the base member 212. The base member 212 includes a first surface 211a and a second surface 211b. The base member 212 is formed of a light-transmitting material, and is formed of, for example, a transparent resin. The reflector array 20 is located on the second surface 211b. The reflector array 20 is arranged to reflect the light rays from the first surface 211a side and form a floating image at the first surface 211a side.

The second surface 211b includes a portion of a circular arc that is convex toward the negative Z-axis side when projected onto the YZ-plane. In the example, the virtual plane P0 is a virtual plane that is parallel to a tangent plane contacting the portion of the circular arc at the position furthest toward the negative Z-axis side. The second surface 211b is such a curved surface, and the reflector array 20 is located on the curved surface.

According to the modification described with reference to FIG. 8A, the configuration of the base member 212 has a thickness such that a certain distance is provided between the first surface 211a and the second surface 211b even at the two Y-axis direction end portions. It is favorable to reduce the thickness of the base member 212 because the light rays that are incident on the image-forming element 210 reach the reflector array 20 via the base member 212.

As shown in FIG. 8B, an image-forming element 210a includes the reflector array 20 and a base member 212a. The base member 212a includes the first surface 211a and the second surface 211b, and the distance between the first surface 211a and the second surface 211b is substantially zero at the two Y-axis direction end portions.

Thus, an appropriate shape of the base member can be arbitrarily selected according to the size of the image-forming element, the material of the base member, the application, etc.

(Third Modification)

Figure 9A:
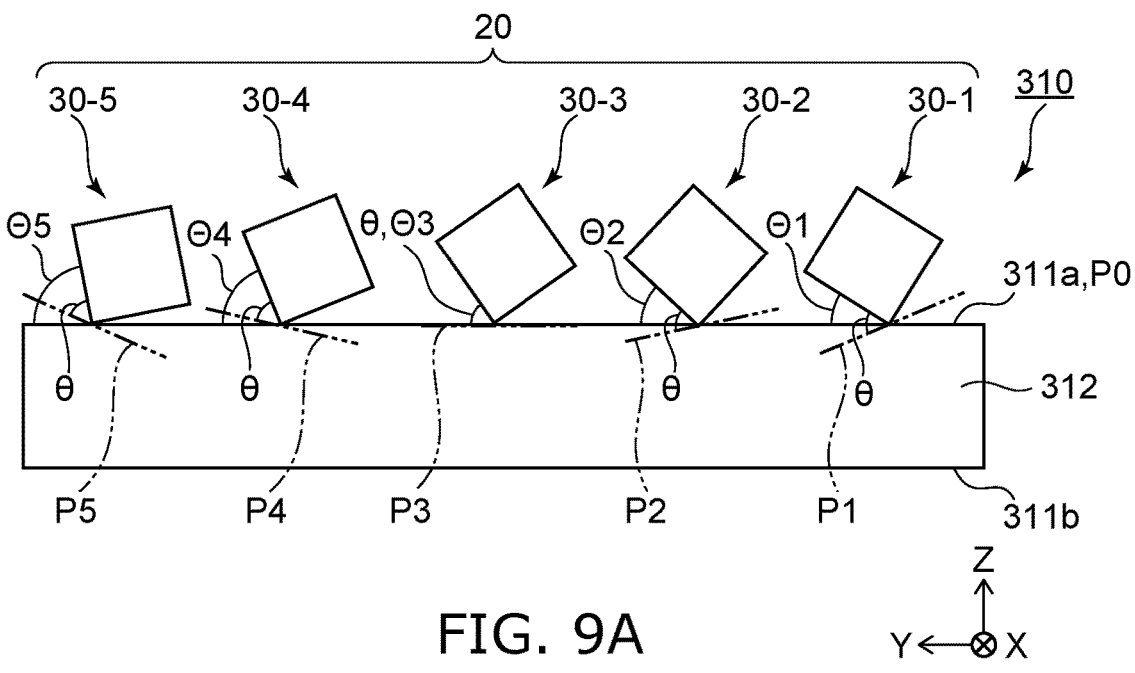
FIG. 9A is a schematic side view illustrating an image-forming element according to a third modification of the first embodiment.
Figure 9B:
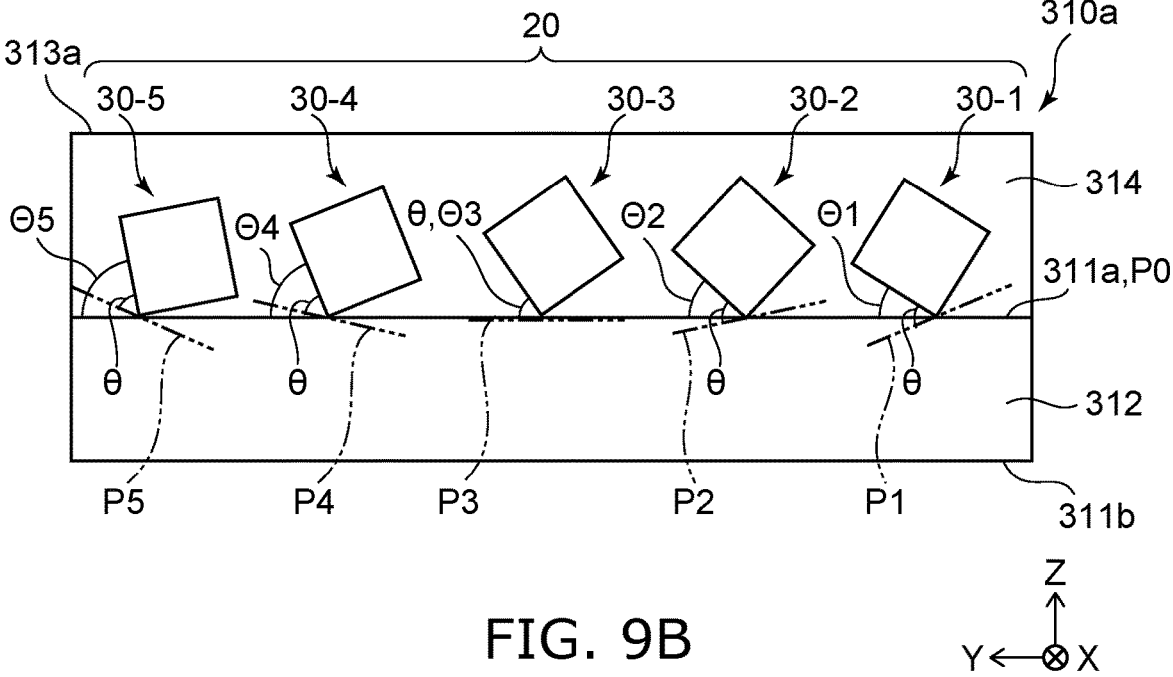
FIG. 9B is a schematic side view illustrating an image-forming element according to the third modification of the first embodiment.

FIGS. 9A and 9B are schematic side views illustrating an image-forming element according to the modification.

As long as the angles of the dihedral corner reflectors with respect to the virtual plane P0 can be set similarly to the first embodiment and the like described above, it is unnecessary to form the reflector array 20 on a curved surface, and the reflector array 20 may be located on one plane.

Similarly to the case described with reference to FIG. 6, FIGS. 9A and 9B are enlarged schematic illustrations of the five dihedral corner reflectors 30-1 to 30-5. The five dihedral corner reflectors 30-1 to 30-5 are shown together with the tilts corresponding to the positions at which the dihedral corner reflectors 30-1 to 30-5 are located.

As shown in FIG. 9A, an image-forming element 310 of the modification includes the reflector array 20 and a base member 312. The base member 312 includes a first surface 311*a* and a second surface 311*b*. The second surface 311*b* is located at a position at the side opposite to the first surface 311*a*. The first surface 311*a* is a plane that is substantially parallel to the XY-plane. That is, the first surface 311*a* may be used as the virtual plane P0.

The angles of the dihedral corner reflectors 30-1 to 30-5 with respect to the virtual plane P0 are respectively Θ1 to Θ5, and the magnitudes of Θ1 to Θ5 are Θ1<Θ2<Θ3<Θ4<Θ5. The positions of the dihedral corner reflectors 30-1 to 30-5 in the Y-axis are the same as the positions of the dihedral corner reflectors 30-1 to 30-5 in the Y-axis shown in FIG. 6. Accordingly, for the tangent planes P1 to P5 of the circular arc corresponding to the positions in the Y-axis of FIG. 6, the angles between the dihedral corner reflectors 30-1 to 30-5 and the tangent planes P1 to P5 all have the same value of the angle θ.

As shown in FIG. 9B, an image-forming element 310*a* of the modification includes the reflector array 20 and the base member 312, and further includes a protective layer 314. The reflector array 20 and the base member 312 are the same as those of the image-forming element 310 described with reference to FIG. 9A. The protective layer 314 is provided to cover the reflector array 20 and the first surface 311*a*.

When the light rays are incident on the image-forming element 310*a* via the protective layer 314, the protective layer 314 includes a material having high light transmissivity so that the transmitted amount of the light rays is substantially constant. It is favorable for a surface 313*a* of the protective layer 314 to be sufficiently flat so that the refraction angles of the incident light rays are substantially constant.

Thus, by using such a configuration, the image-forming elements 310 and 310*a* can be thinned.

(Fourth Modification)

Figure 10A:
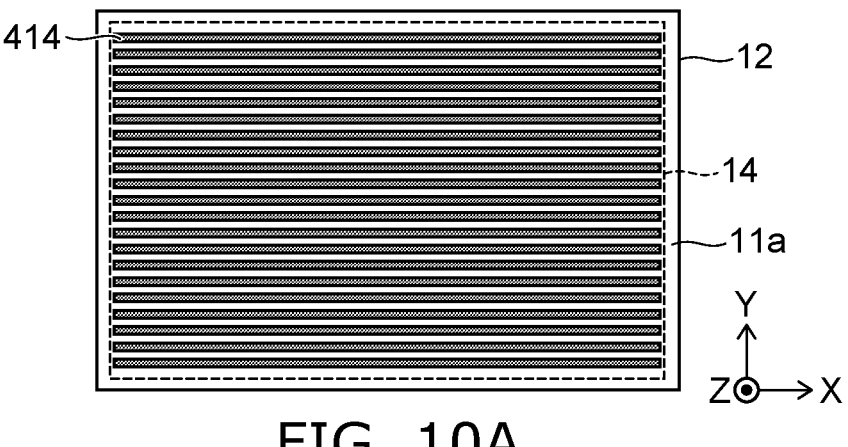
FIG. 10A is a schematic plan view illustrating a portion of an image-forming element according to a fourth modification of the first embodiment.
Figure 10B:
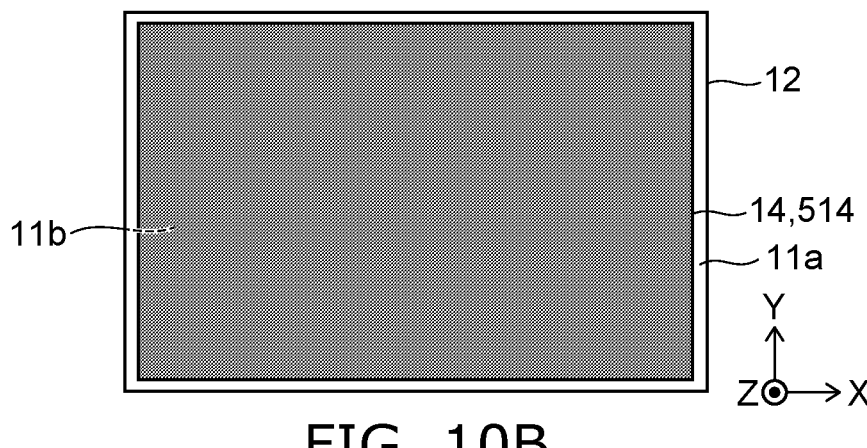
FIG. 10B is a schematic plan view illustrating a portion of the image-forming element according to the fourth modification of the first embodiment.
Figure 10C:
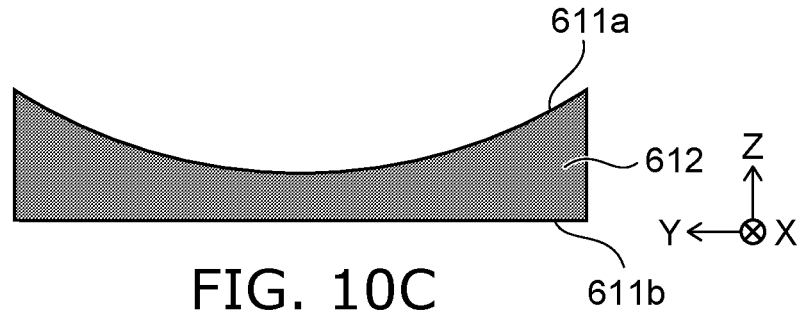
FIG. 10C is a schematic side view illustrating a portion of the image-forming element according to the fourth modification of the first embodiment.

FIGS. 10A to 10C are schematic plan views and a side view illustrating a portion of an image-forming element according to the modification.

FIGS. 10A to 10C show the configuration of the base member of the image-forming element.

According to the first embodiment described above and the other modifications described above, light rays that are not incident on the first reflecting surface 31 or on the second reflecting surface 32 escape as-is in the negative direction of the Z-axis. A portion of the light reflected by the first reflecting surface 31 travels toward the second reflecting surface 32, and the rest of the light escapes in the negative direction of the Z-axis without traveling toward the second reflecting surface 32. Also, there are also cases where a portion of the light ray LL of FIG. 4C travels straight as-is without being reflected by any of the reflecting surfaces. Thus, the light rays and reflected light that escape toward the second surface side may be transmitted as-is by the base member, or may be absorbed. According to the modification, a component that absorbs the light rays and reflected light escaping toward the second surface side is added to the base member.

As shown in FIG. 10A, the base member 12 includes a light-absorbing body (a light-absorbing member) 414 formed on the first surface 11*a*. The light-absorbing body 414 is located in the regions between the reflector rows 22 shown in FIG. 1. For example, the light-absorbing body 414 is formed by coating a black coating material. Although the reflector rows 22 are formed at locations not coated with the light-absorbing body 414, the exposed portions of the base part 36 shown in FIG. 3 and FIGS. 4A to 4B also may be coated with a black coating material.

As shown in FIG. 10B, the base member 12 includes a light-absorbing member 514. The light-absorbing member 514 is provided over the reflector formation region 14 on the first surface 11*a*. This is advantageous in that it is easier to form the light-absorbing member 514 when the pitch of the reflector rows is narrow, etc. The light-absorbing member 514 may be provided over the second surface 11*b*.

When the reflector array is located at the second surface side as described with reference to FIGS. 8A and 8B, the light-absorbing body 414 and/or the light-absorbing member 514 may be formed at the second surface 211*b* of the base member.

When the reflector array is formed on the first surface, a light-absorbing material may be formed over the entire base member.

As shown in FIG. 10C, a base member 612 is formed of a light-absorbing material, and is formed of, for example, a black resin. By making the entire base member light-absorbing, the light rays that escape through the reflector array and travel toward the second surface side can be prevented from being reflected by a second surface 611*b* and returning to a first surface 611*a* side.

(Fifth Modification)

Figure 11:
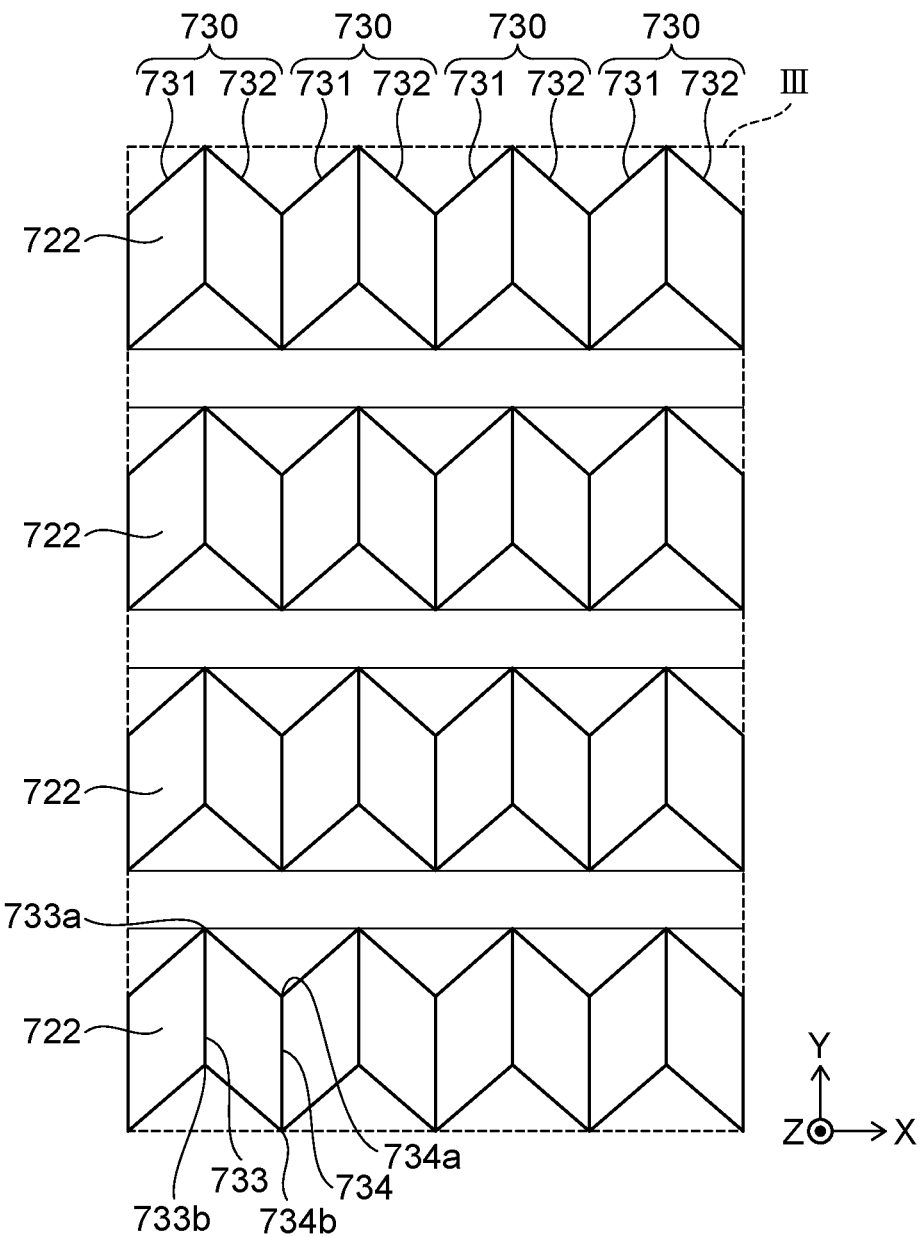
FIG. 11 is a schematic enlarged plan view illustrating a portion of an image-forming element according to a fifth modification of the first embodiment.

FIG. 11 is a schematic enlarged plan view illustrating a portion of an image-forming element according to the modification.

FIG. 11 shows an enlarged plan view of a region corresponding to portion III of FIG. 1 according to the modification.

Although the first and second reflecting surfaces 31 and 32 of the dihedral corner reflector 30 each are substantially square when viewed in front-view as described with reference to FIG. 3, the first reflecting surface 31 and the second reflecting surface 32 are not limited thereto, and may be rectangular.

As shown in FIG. 11, multiple reflector rows 722 each include multiple dihedral corner reflectors 730. The dihedral corner reflector 730 includes a first reflecting surface 731 and a second reflecting surface 732. The first reflecting surface 731 and the second reflecting surface 732 each have a rectangular shape with the Y-axis direction sides as the long sides when viewed in front-view. For example, the spacing of the adjacent reflector rows 722 is the same as the spacing of the reflector rows 22 described with reference to FIG. 3.

The first reflecting surface 731 and the second reflecting surface 732 are connected at a valley-side connecting line 733, and the adjacent dihedral corner reflectors 730 are connected to each other at a hill-side connecting line 734.

By setting the sides along the Y-axis direction of the first and second reflecting surfaces 731 and 732 to be the long sides, the area for reflecting the light rays is increased. The luminance of the display when forming the floating image can be set to be higher by using the image-forming element of the modification than when the reflecting surface is square. Although the rectangles of the first and second reflecting surfaces according to the modification have the sides along the Y-axis direction as the long sides, the rectangles may have these sides as the short sides. Thus, the length in the Y-axis direction of the dihedral corner reflector can be reduced, and the image-forming element can be smaller.

Appropriate combinations of the modifications described above are applicable. For example, the dihedral corner reflector that includes the rectangular first reflecting surface and second reflecting surface is applicable to the base members 212 and 212*a* described with reference to FIGS. 8A and 8B. The combinations of the modifications are not limited to two types and can be three or more types. For example, the dihedral corner reflector that includes the rectangular first reflecting surface and second reflecting surface is applicable to the base member 312 and the protective layer 314 described with reference to FIGS. 9A and 9B, and the base member can be formed of a light-absorbing material as described with reference to FIG. 10C.

Operations of the image-forming elements of the embodiment and modifications of the embodiment will now be described, including the operation principle. Unless otherwise noted hereinbelow, the image-forming element 10 of the first embodiment described with reference to FIGS. 1 to 6 will be described. The operations of the modifications can be understood to be similar to that of the first embodiment.

The image-forming element of the embodiment forms a floating image at the incident light side by partially utilizing the operation principle of a corner cube reflector. Therefore, first, the operation principle of a corner cube reflector will be described, followed by a description of the operation of the image-forming element of the embodiment.

Figure 12A:
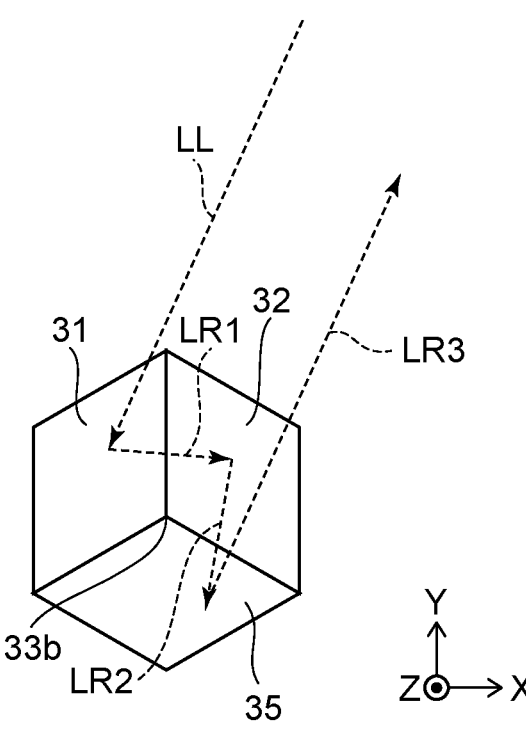
FIG. 12A is a schematic plan view for describing an operation of an image-forming element of a comparative example.

FIG. 12A is a schematic plan view for describing an operation of an image-forming element of a comparative example.

FIG. 12A shows the configuration of the corner cube reflector and how the incident light is reflected.

As shown in FIG. 12A, the corner cube reflector includes the first reflecting surface 31, the second reflecting surface 32, and a third reflecting surface 35. The first reflecting surface 31, the second reflecting surface 32, and the third reflecting surface 35 are connected to be substantially orthogonal to each other. The first reflecting surface 31, the second reflecting surface 32, and the third reflecting surface 35 are arranged so that the vertex 33*b* at which the first reflecting surface 31, the second reflecting surface 32, and the third reflecting surface 35 are connected is positioned lowest in the Z-axis direction.

The light ray LL that is incident on the first reflecting surface 31 is reflected by the first reflecting surface 31. The reflected light LR1 that is reflected by the first reflecting surface 31 is reflected by the second reflecting surface 32. The reflected light LR2 that is reflected by the second reflecting surface 32 is reflected by the third reflecting surface 35. A reflected light LR3 that is reflected by the third reflecting surface 35 is emitted from the corner cube reflector. Because the law of reflection holds at each reflecting surface, the reflected light LR3 that is emitted from the corner cube reflector is parallel to the light ray LL incident on the corner cube reflector. Although the light ray LL described above is incident on the first reflecting surface 31, the emitted light is parallel to the incident light even when the light ray LL is incident on the second reflecting surface 32 or incident on the third reflecting surface. Such an operation is called retroreflection.

Figure 12B:
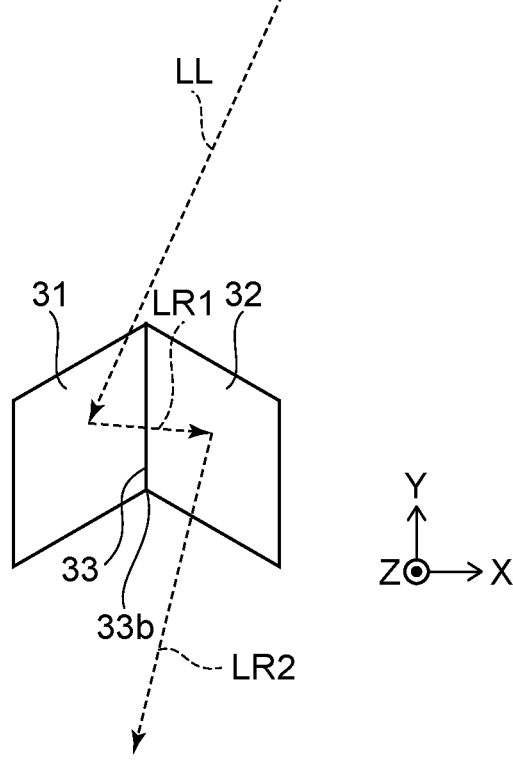
FIG. 12B is a schematic plan view for describing an operation of the image-forming element of the first embodiment.

FIG. 12B is a schematic plan view for describing an operation of the image-forming element of the embodiment.

As shown in FIG. 12B, the first reflecting surface 31 and the second reflecting surface 32 are arranged to be substantially orthogonal and are connected at the valley-side connecting line 33. The vertex 33*b* is arranged to be the minimum value in the Z-axis direction. Comparing the dihedral corner reflector 30 and the corner cube reflector of FIG. 12A, the dihedral corner reflector 30 differs from the corner cube reflector in that the third reflecting surface 35 is not included.

Because the dihedral corner reflector 30 does not include the third reflecting surface 35 shown in FIG. 12A, the reflected light LR2 that is reflected by the second reflecting surface 32 travels straight as-is. Here, because the valley-side connecting line 33 is arranged at a prescribed angle from the XY-plane, the reflected light LR2 that is emitted from the dihedral corner reflector 30 is emitted toward the same side as the side from which the light ray LL is incident.

Figure 13:
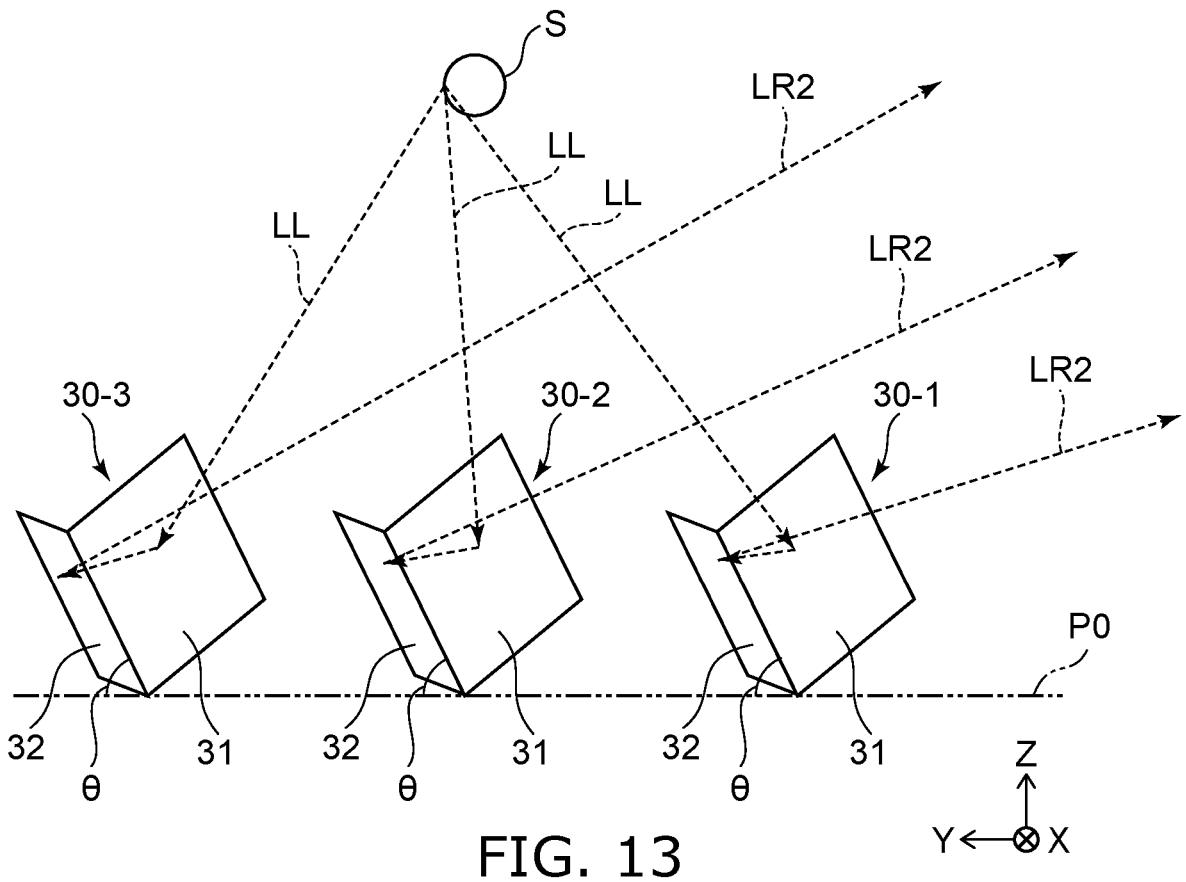
FIG. 13 is a schematic side view illustrating an image-forming element of another comparative example for describing the operation of the image-forming element of the first embodiment.

FIG. 13 is a schematic side view illustrating an image-forming element of another comparative example to describe the operation of the image-forming element of the embodiment.

In FIG. 13, the multiple reflector rows 22 shown in FIGS. 1 and 3 each extend along the X-axis direction, and the multiple reflector rows 22 are arranged at constant spacing in the Y-axis direction. FIG. 13 shows the three dihedral corner reflectors 30-1 to 30-3. The dihedral corner reflectors 30-1 to 30-3 each show one of the three reflector rows 22. The dihedral corner reflectors 30-1 to 30-3 are shown in slightly rotated states on the XY-plane to display how the light rays are reflected. Although the reference numerals are different to differentiate the positions in the Y-axis, the configurations of the dihedral corner reflectors 30-1 to 30-3 are the same as that of the dihedral corner reflector 30 described with reference to FIGS. 4A and 4B.

The dihedral corner reflectors 30-1 to 30-3 are located on a plane and are arranged in a straight line along the Y-axis direction. A light source S is located directly above the dihedral corner reflectors 30. More specifically, the light source S is arranged above the dihedral corner reflectors 30-1 to 30-3 so that a light ray parallel to the Z-axis is incident on one of the dihedral corner reflectors 30-1 to 30-3. The light source S spreads in two dimensions or three dimensions, and FIG. 13 shows a case where light rays emitted from one point of the light source S are incident respectively on the dihedral corner reflectors 30-1 to 30-3. This is similar for the configurations of the light source S and the dihedral corner reflectors 30-1 to 30-3 of FIGS. 14 and 15 below.

As shown in FIG. 13, the light rays LL that are emitted from the light source S and incident on the first reflecting surfaces 31 of the dihedral corner reflectors 30-1 to 30-3 are reflected by the first reflecting surfaces 31 of the dihedral corner reflectors 30-1 to 30-3 toward the second reflecting surfaces 32. The three second reflecting surfaces 32 each emit the reflected light LR2. Here, the three dihedral corner reflectors 30-1 to 30-3 are arranged to be tilted at the same angle θ with respect to the virtual plane P0. In such a case, the angle θ is set to a value greater than 0° and less than 90°. For example, the angle θ is set to 35.3°. According to the law of reflection by each reflecting surface, the reflected light LR2 that is emitted by the dihedral corner reflectors 30-1 to 30-3 arranged along the Y-axis undesirably spreads without forming a floating image. When θ is set to 0°, a floating image is formed at the light source side (see Patent Literature 1, etc.), and when θ is set to 90°, the operation of a transmission-type image-forming element is realized in which a floating image is formed via the dihedral corner reflectors at the side opposite to the light source when referenced to the image-forming element.

The angle θ corresponds to the angle with respect to the mounting surface of the corner cube reflector in a well-known retroreflective image-forming element, and is the angle with respect to the mounting surface of the corner cube reflector described with reference to FIG. 12A. This angle is the angle with respect to the mounting surface of the connecting line of the first and second reflecting surfaces 31 and 32. The mounting surface of the corner cube reflector corresponds to the virtual plane P0 of FIG. 13.

In the image-forming element of the embodiment, the dihedral corner reflectors are located at different angles with respect to the virtual plane P0 according to the positions in the Y-axis so that the reflected light reflected twice by the dihedral corner reflectors 30 is reflected toward the same side as the light source S and forms a floating image.

Figure 14:
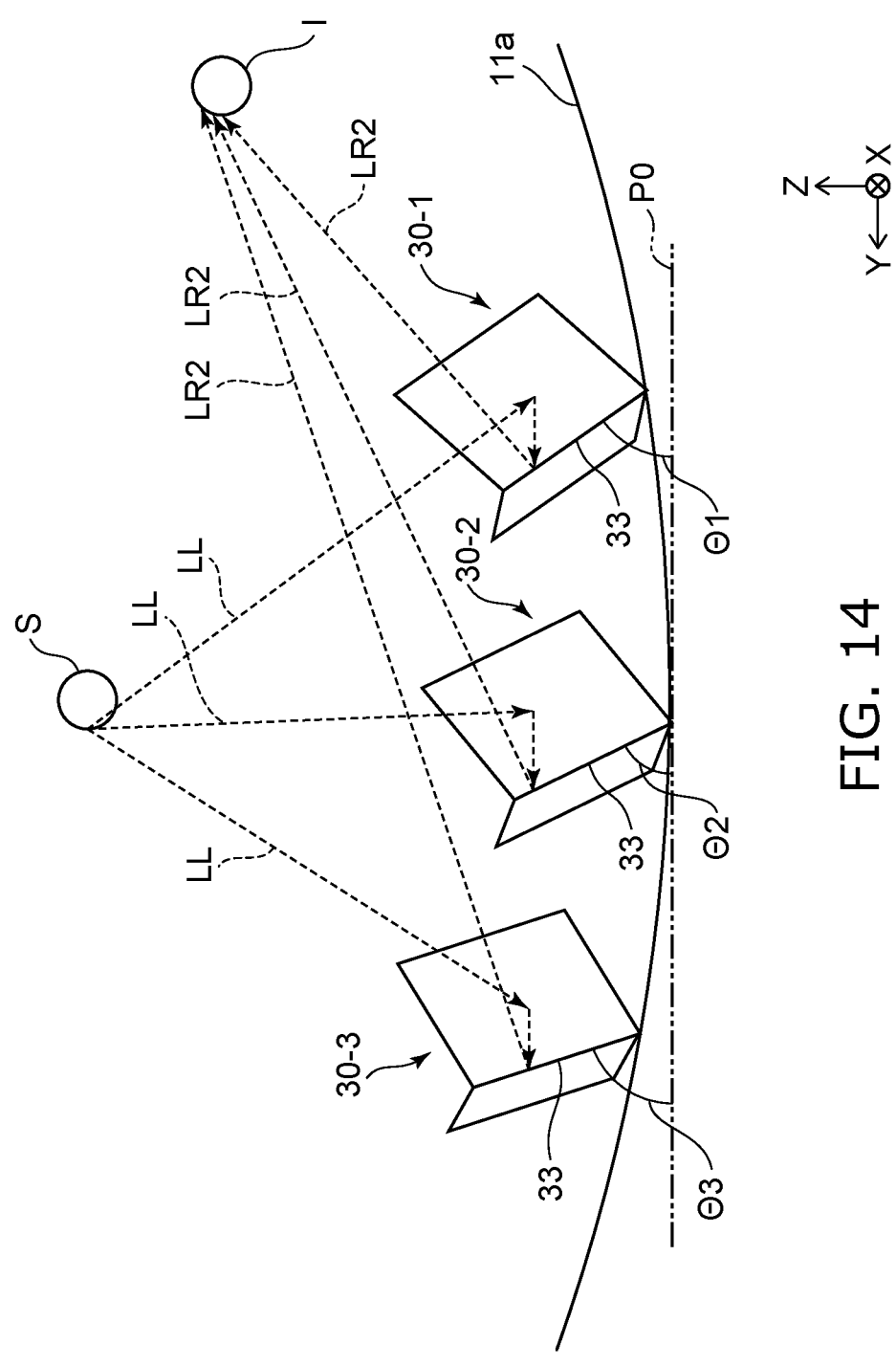
FIG. 14 is a schematic side view for describing the operation of the image-forming element of the first embodiment.
Figure 15:
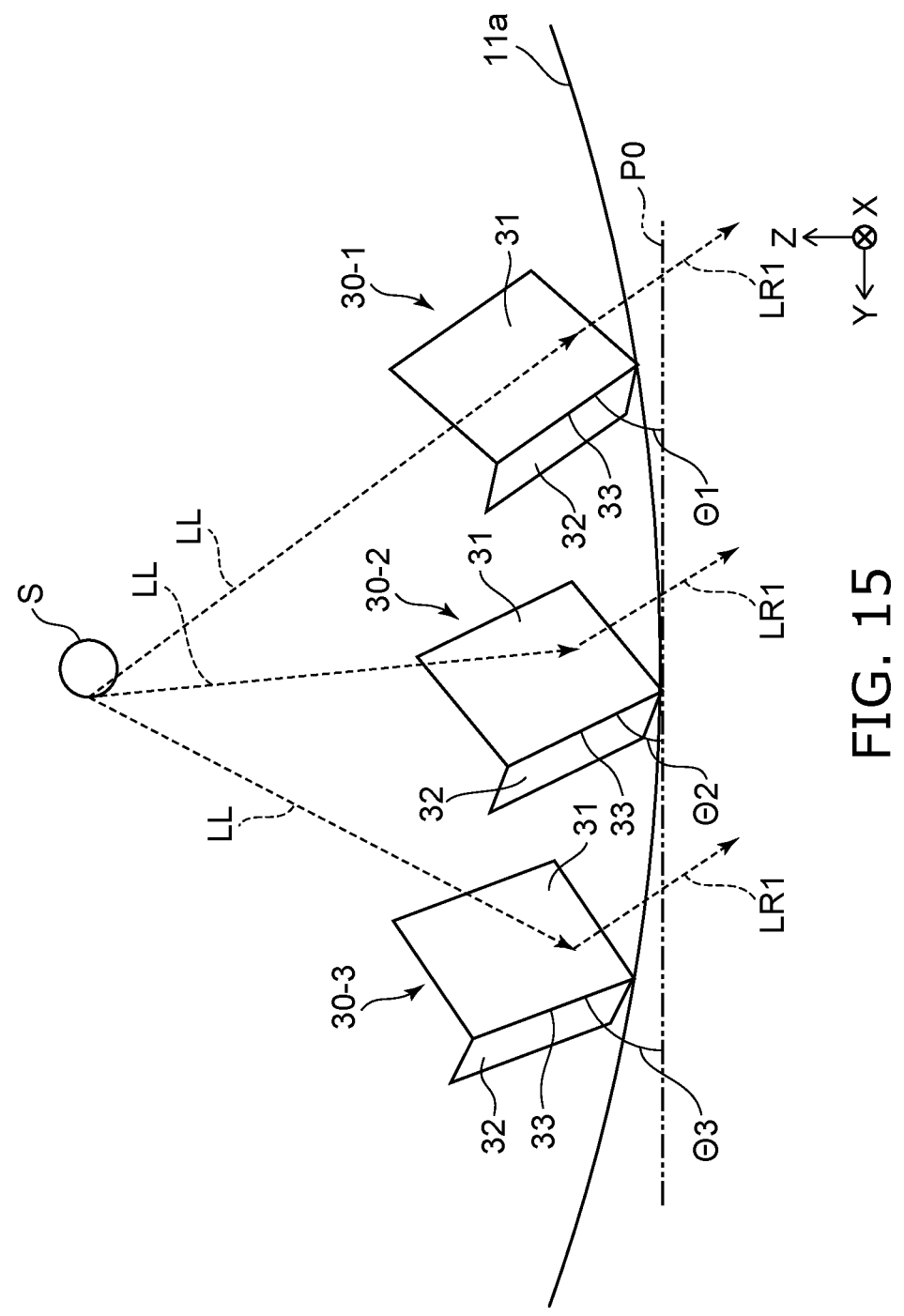
FIG. 15 is a schematic side view for describing the operation of the image-forming element of the first embodiment.

FIGS. 14 and 15 are schematic side views for describing the operation of the image-forming element of the embodiment.

In the image-forming element of the embodiment as shown in FIG. 14, the first surface 11*a* is set to be a portion of a circular arc that is convex toward the negative Z-axis side when projected onto the YZ-plane. The dihedral corner reflectors 30-1 to 30-3 are located on the first surface 11*a*. In the example, the angles Θ1 to Θ3 of the tilts of the dihedral corner reflectors 30-1 to 30-3 with respect to the virtual plane P0 are set to increase in the positive direction of the Y-axis. Thus, by setting the angles Θ1 to Θ3, the reflected light LR2 that is reflected twice by the dihedral corner reflectors 30 forms a floating image I at the first surface 11*a* side at which the light source S is located.

The description described above is conceptually understood as follows.

Namely, when the dihedral corner reflectors 30-1 to 30-3 are formed on a flat surface at angles greater than 0° and less than 90°, the twice-reflected light of the dihedral corner reflectors 30-1 to 30-3 undesirably spreads without forming a floating image at the side at which the light source is located. Therefore, by curving the surface at which the dihedral corner reflectors 30-1 to 30-3 are formed toward the negative Z-axis side along the Y-axis direction, a floating image can be formed at the side at which the light source is located.

FIG. 15 shows when the light rays LL incident from the light source S are not reflected twice respectively by the dihedral corner reflectors 30-1 to 30-3, but are reflected only once, and are not emitted toward the same side as the light source S.

As shown in FIG. 15, when the light ray LL emitted from the light source S does not travel toward the second reflecting surface 32 after being incident on the first reflecting surface 31, the reflected light LR1 that is reflected by the first reflecting surface 31 travels below the dihedral corner reflector 30. This is because the reflector rows 22 shown in FIGS. 1 and 3 are arranged along the Y-axis direction with spacing interposed. Although not illustrated, the light ray LL that is emitted from the light source S and is not incident on the first reflecting surface 31 or on the second reflecting surface 32 travels as-is below the dihedral corner reflectors 30-1 to 30-3.

Thus, in the image-forming element of the embodiment, by setting the angles Θ1 to Θ3 corresponding to the positions in the Y-axis of the dihedral corner reflectors 30-1 to 30-3, a floating image can be formed at the same side as the light source S, and simultaneously, by using the dihedral corner reflectors, the once-reflected light and the light rays that are not reflected do not form a floating image at the same side as the light source S. Therefore, ghosts can be suppressed because false images other than the real image are not formed at the light source S side. Also, surreptitious viewing of the floating image can be prevented.

The image-forming element 10 of the embodiment operates even when the position of the light source and the position of the floating image are interchanged.

Figure 16:
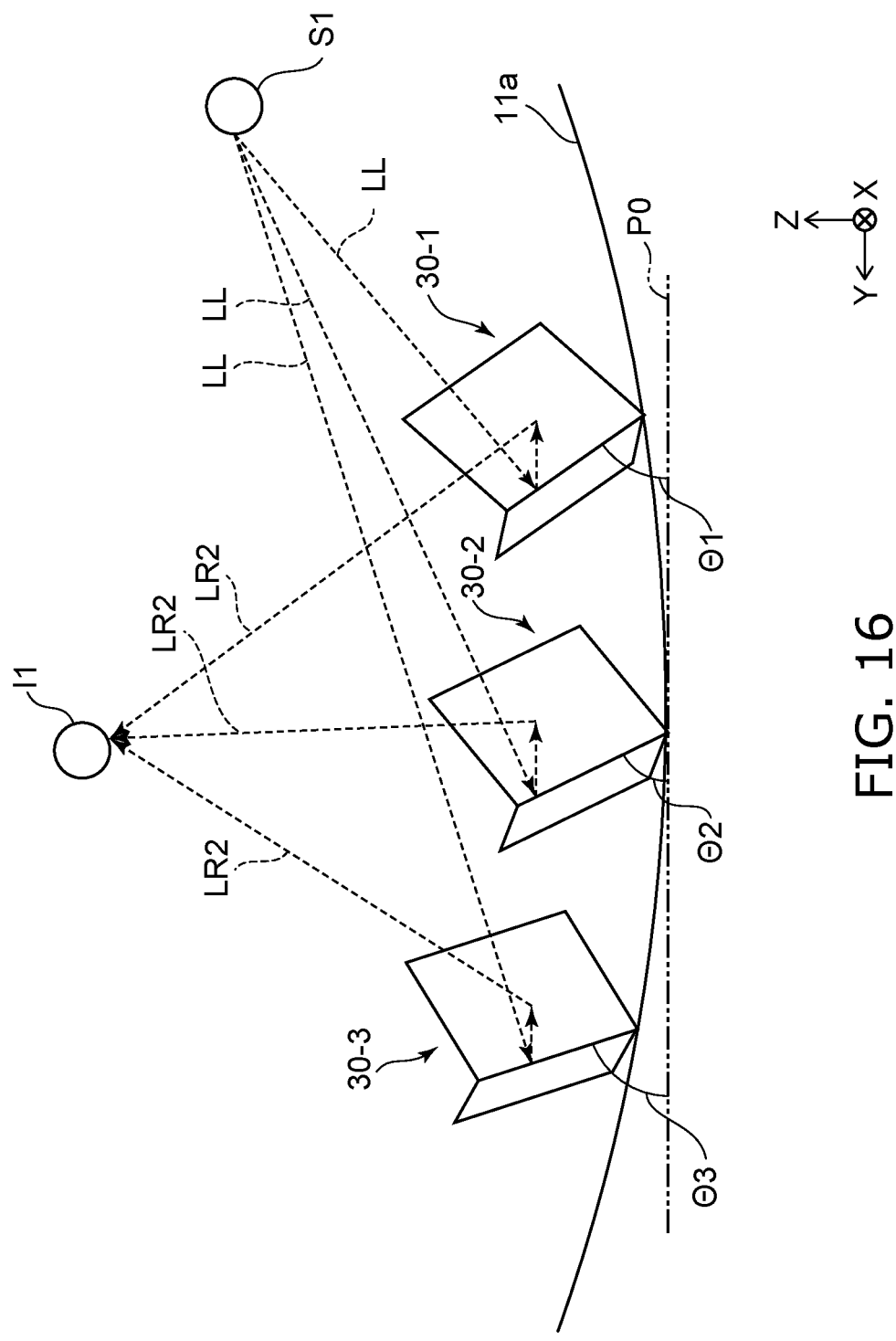
FIG. 16 is a schematic side view for describing the operation of the image-forming element of the first embodiment.
Figure 17:
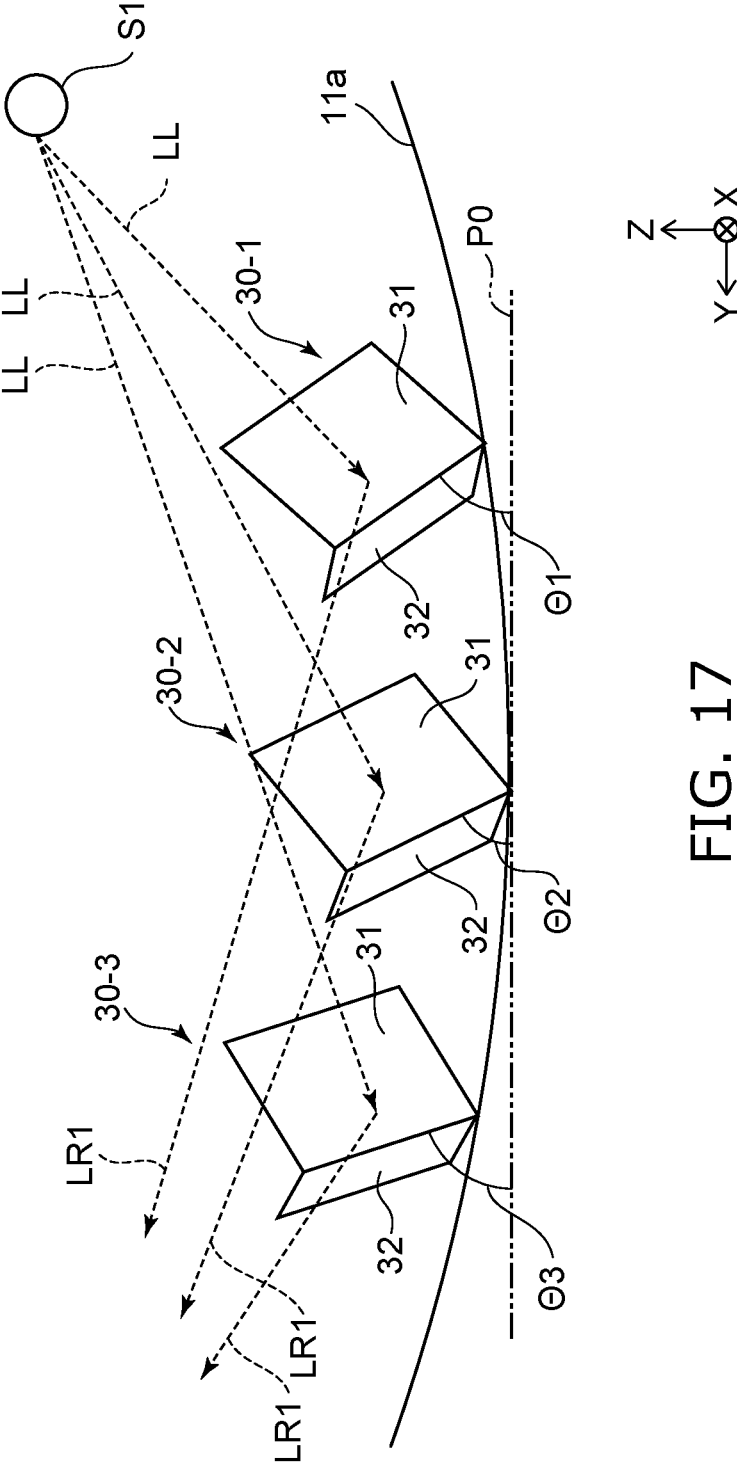
FIG. 17 is a schematic side view for describing the operation of the image-forming element of the first embodiment.

FIGS. 16 and 17 are schematic side views for describing operations of the image-forming element of the embodiment.

In FIGS. 16 and 17, the configurations of the dihedral corner reflectors 30-1 to 30-3 and the relationship between the dihedral corner reflectors 30-1 to 30-3, the first surface 11*a*, and the virtual plane P0 are the same as those described with reference to FIGS. 14 and 15.

As shown in FIG. 16, a light source 51 is located at the position of the floating image I described with reference to FIG. 14; in such a case, a floating image I1 is formed at the position of the light source S of FIG. 14. The light rays LL that are emitted from the light source 51 are reflected twice respectively by the dihedral corner reflectors 30-1 to 30-3, and the reflected light LR2 forms a floating image at the position of the floating image I1.

As shown in FIG. 17, there are cases where the light rays LL that are incident on the dihedral corner reflectors 30 from the light source 51 are reflected by the first reflecting surfaces 31, and the reflected light LR1 is emitted toward the first surface 11*a* side without traveling toward the second reflecting surfaces 32. There are cases where such reflected light LR1 forms an image at a different position from the floating image I1 shown in FIG. 16. Such an image is a false image. In other words, when the reflected light that is once-reflected by the dihedral corner reflectors 30 is reflected toward the first surface 11*a* side without being reflected twice, a floating image is formed as a real image at the side at which the light source 51 is located, and a false image is formed at a different position from the floating image formation position of the real image. The position at which the real image is formed in such a case can be directly above the dihedral corner reflectors 30-1 to 30-3.

As conceptually described above, the angles of the dihedral corner reflectors may be determined by arranging the dihedral corner reflectors on a flat surface and then curving the flat surface along the Y-axis direction and determining the angles corresponding to the curve, or the angles may be determined using other methods. For example, the angles of the dihedral corner reflectors with respect to the virtual plane P0 may be determined by setting the angular difference between the adjacent dihedral corner reflectors along the Y-axis to be a prescribed value. For example, when the prescribed value is set to 1°, then Θ2=Θ1+1° and Θ3=Θ2+1° may be set. Ultimately, in either the case of the position of the light source S or the case of the position of the light source 51, the angles Θ1 to Θ3 of the dihedral corner reflectors can be appropriately set by using experiments, simulation, etc., so that the incident light rays are reflected twice and form a floating image at the desired position. For example, according to the case of the embodiment shown in FIG. 14, the light source S is substantially directly above the virtual plane P0, or, according to the case of the embodiment shown in FIG. 16, the floating image I1 is substantially directly above the virtual plane P0. By appropriately adjusting the angles of the dihedral corner reflectors with respect to the virtual plane P0, it is also possible to appropriately modify the positions of the light source S and/or the floating image I1. When making such a design modification, ray analysis tools such as ray tracing simulation, etc., can be effectively utilized.

Figure 18:
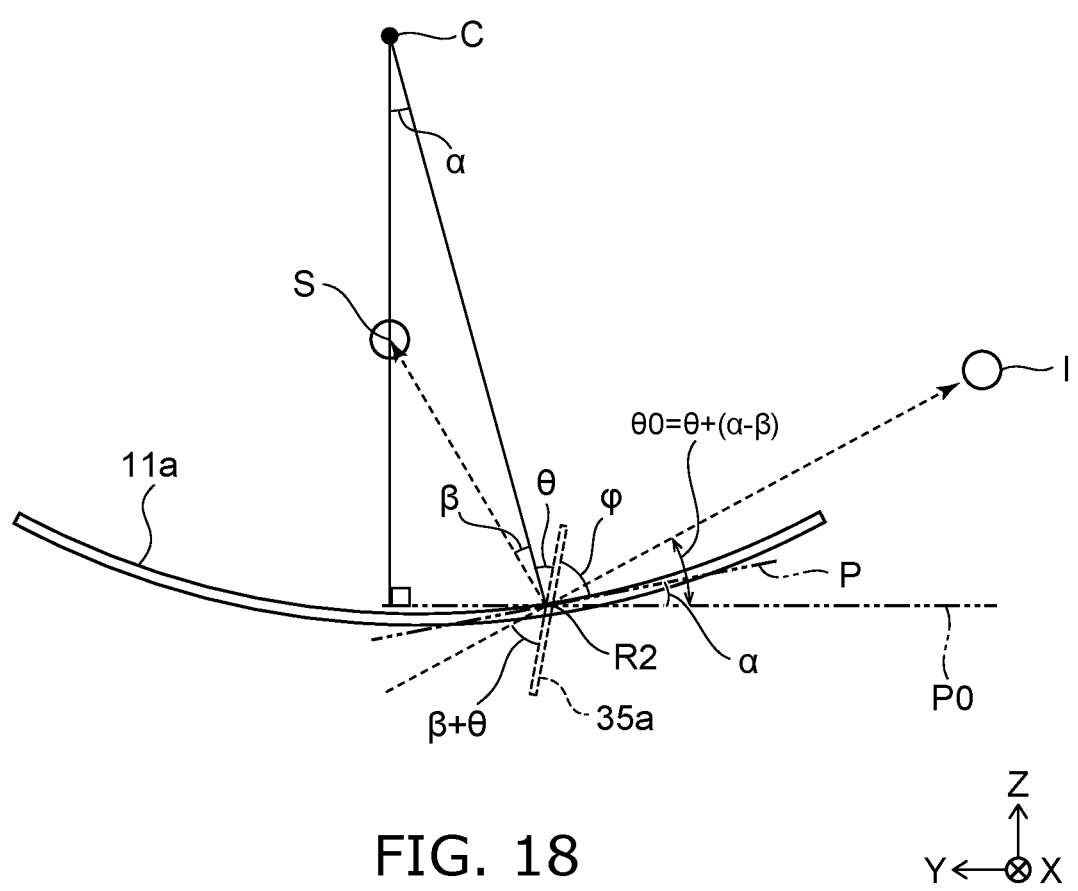
FIG. 18 is a schematic view for describing a calculation example related to the image-forming element of the first embodiment.

FIG. 18 is a schematic view for describing a calculation example related to the image-forming element of the embodiment.

Hereinbelow, a method for determining the emergence angle of the reflected light reflected twice by the dihedral corner reflector of the image-forming element 10 shown in FIG. 1 will be described using FIG. 18. The emergence angle of the twice-reflected light is determined by utilizing the retroreflection by the three reflecting surfaces of the corner cube reflector described with reference to FIG. 12A. The third reflecting surface of the corner cube reflector is temporarily provided in FIG. 18 and taken as a temporary reflecting surface 35a. The temporary reflecting surface 35a corresponds to the third reflecting surface 35 described with reference to FIG. 12A.

In the dihedral corner reflector 30 shown in FIG. 12B, the angle of the valley-side connecting line 33 with respect to the tangent plane is used as the tilt of the dihedral corner reflector 30. The angle of the valley-side connecting line 33 corresponds to the angle with respect to the tangent plane of the third reflecting surface 35 of the corner cube reflector shown in FIG. 12A.

As shown in FIG. 18, the first surface 11a is a portion of a circular arc having a center C. In FIG. 18, the tangent plane P of the first surface 11a is shown, and the temporary reflecting surface 35a is arranged to be tilted at an angle $\phi$ with respect to the tangent plane P. As described with reference to FIG. 19 below, the angle $\phi$ is about 60°, and more accurately, about 54.7°.

The first surface 11a and the temporary reflecting surface 35a cross at a point R2. The light rays that are emitted from the light source S include the line segment SR2. The line segment SR2 and the line segment CR2 form an angle $\beta$.

The angle between the line segment CS and the line segment CR2 is equal to an angle $\alpha$, wherein the angle $\alpha$ is the angle between the virtual plane P0 and the tangent plane P.

As described with reference to FIG. 19 below, the angle $\theta$ is about 30°, and more accurately, about 35.3°, wherein the angle $\theta$ is the angle between the line segment CR2 and the temporary reflecting surface 35a.

Accordingly, an emergence angle $\theta0$ can be determined by $\theta+(\alpha-\beta)$, wherein the emergence angle $\theta0$ is the angle between the virtual plane P0 and the reflected light due to the second reflection. Here, by setting the position of the center C of the circular arc so that the length of the line segment CS and the length of the line segment SR2 are equal, then $\alpha \approx \beta$, and the reflected light can form a floating image because the emergence angles are uniform at substantially $\theta$. Setting the length of the line segment CS and the length of the line segment SR2 to be equal is substantially equivalent to setting the radius of the circular arc to be 2 times the length of the line segment SR2; accordingly, it is favorable to set the radius of the circular arc forming the first surface 11a to be substantially 2 times the distance from the position of the light source S to the first surface 11a.

FIGS. 19 to 21C are schematic views for describing the calculation example related to the image-forming element of the embodiment.

Figure 19:
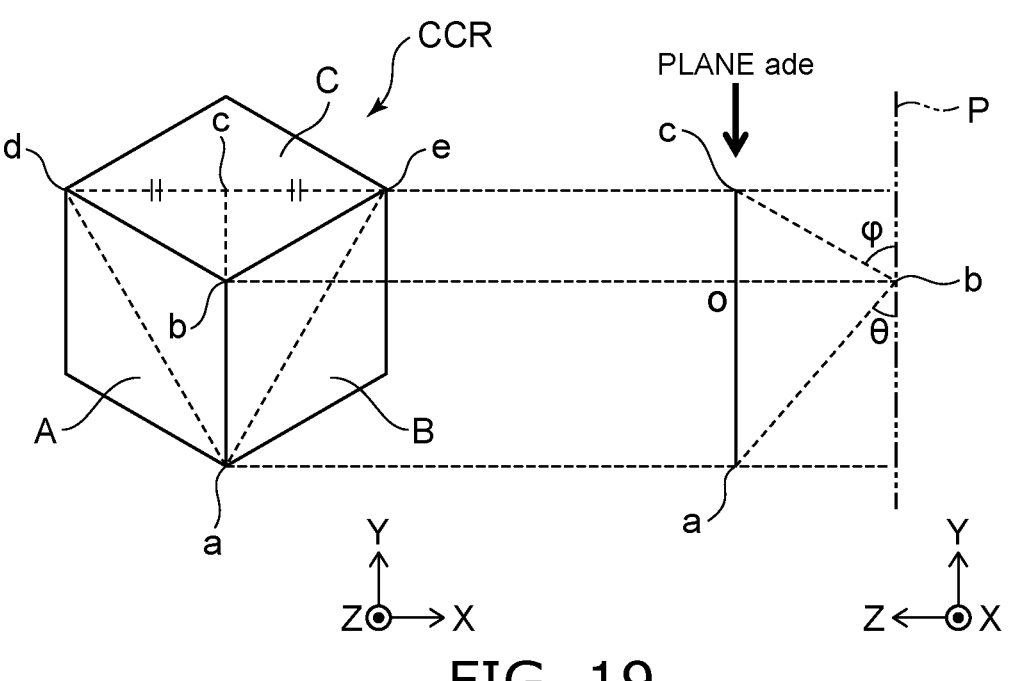
FIG. 19 is a schematic view for describing the calculation example related to the image-forming element of the first embodiment.

FIG. 19 shows a drawing of a corner cube reflector CCR to calculate the angle $\theta$ of the dihedral corner reflector with respect to the tangent plane P.

Figure 20A:
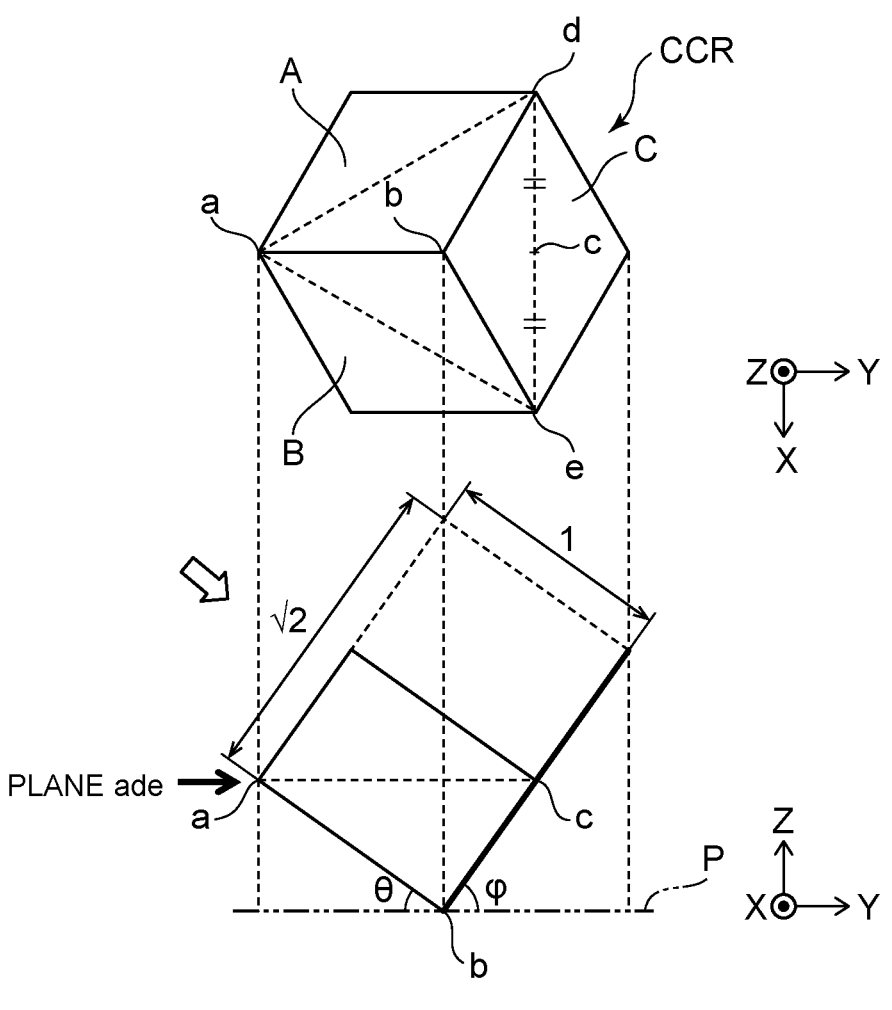
FIG. 20A is a schematic view for describing the calculation example related to the image-forming element of the first embodiment.
Figure 20B:
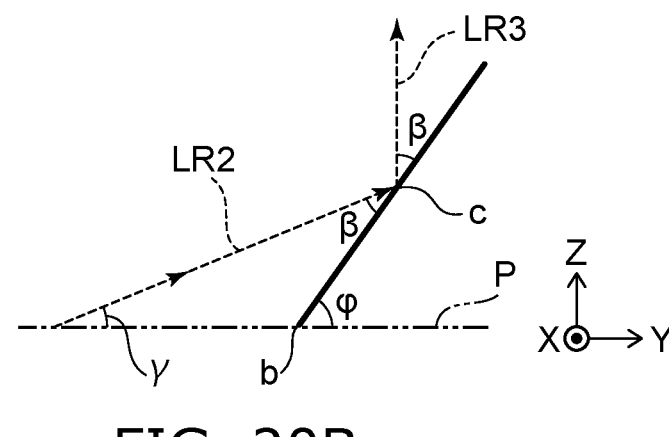
FIG. 20B is a schematic view for describing the calculation example related to the image-forming element of the first embodiment.

FIGS. 20A and 20B show drawings of the corner cube reflector CCR to calculate an emergence angle $\gamma$ of the dihedral corner reflector with respect to the tangent plane P.

Figure 21A:
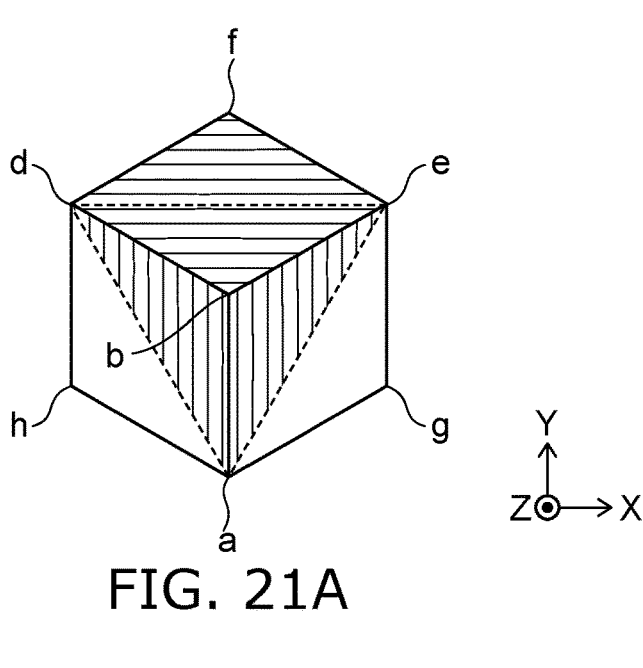
FIG. 21A is a schematic view for describing the calculation example related to the image-forming element of the first embodiment.
Figure 21B:
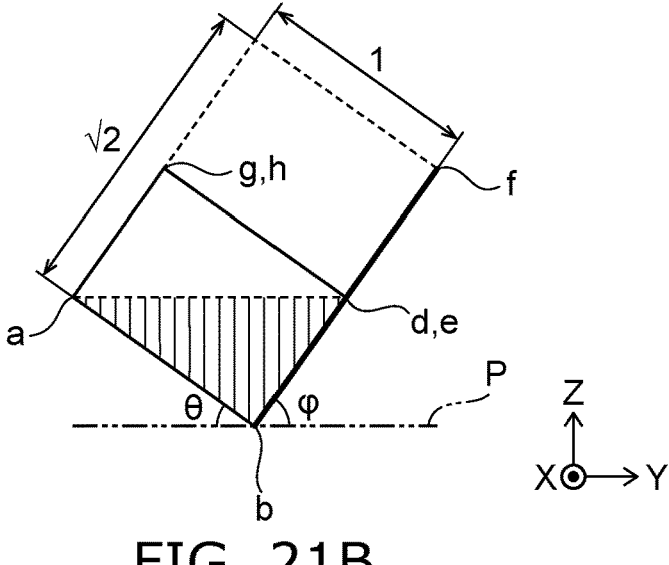
FIG. 21B is a schematic view for describing the calculation example related to the image-forming element of the first embodiment.
Figure 21C:
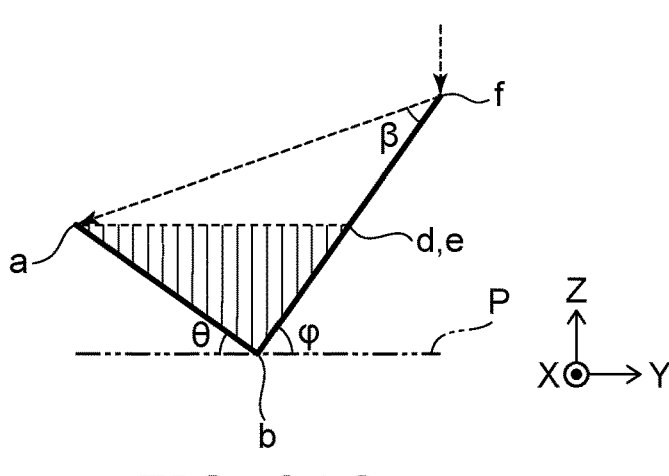
FIG. 21C is a schematic view for describing the calculation example related to the image-forming element of the first embodiment.

FIGS. 21A to 21C show drawings of the corner cube reflector CCR to explain that the dihedral corner reflector of the image-forming element of the embodiment is different from a well-known corner cube reflector.

The drawing at the left of FIG. 19 is a plan view of the corner cube reflector CCR.

As shown in the drawing at the left of FIG. 19, the corner cube reflector CCR includes three reflecting surfaces A, B, and C. In the corner cube reflector described with reference to FIG. 12A, the reflecting surface A corresponds to the second reflecting surface 32, the reflecting surface B corresponds to the first reflecting surface 31, and the reflecting surface C corresponds to the third reflecting surface 35. The corner cube reflector CCR includes the points a to e, the points a and b are the end portions of a connecting line of the reflecting surfaces A and B, the points b and d are the end portions of the connecting line of the reflecting surfaces A and C, and the points b and e are the end portions of the connecting line of the reflecting surfaces B and C. The corner cube reflector CCR contacts the tangent plane P at the point b. This situation corresponds to the dihedral corner reflector 30 contacting the tangent plane P at the vertex 33b described with reference to FIGS. 4A and 4B. The point c is the midpoint of the line segment de. In the example, the reflecting surfaces A, B, and C are taken to be squares having sides with lengths of 1.

The drawing at the right of FIG. 19 shows a partial side view of the corner cube reflector CCR, and shows the tangent plane P at which the corner cube reflector CCR is mounted. Also, the relationship of the points a, b, c, and o is shown to correspond to the drawing at the left of FIG. 19. The points d and e overlap the point c.

As shown in the drawing at the right of FIG. 19, the virtual plane ade can be defined as a plane parallel to the tangent plane P. Accordingly, the length of the line segment bc is $1/\sqrt{2}$.

The point at which the normal of the tangent plane P passing through the point b crosses the plane ade is called o. Because the line segment ac is a bisector of the equilateral triangle ade of which one side has a length of $\sqrt{2}$, the length of the line segment ac is $\sqrt{3}/\sqrt{2}$; therefore, the length of the line segment co is $1/\sqrt{6}$.

From the above, cos $\phi$=line segment co/line segment bc=$1/\sqrt{3}$, and $\phi \approx 54.7°$. The angle $\theta$ between the line segment ab and the tangent plane P is $\theta=90°-\phi \approx 35.3°$.

In FIGS. 20A and 20B, the configuration of the corner cube reflector CCR is the same as that of FIG. 19. In the upper drawing of FIG. 20A, the corner cube reflector CCR is shown rotated clockwise 90° from FIG. 19 for convenience of description. The lower drawing of FIG. 20A is a side view of the corner cube reflector CCR shown to correspond to the positions of the points a, b, and c of the upper drawing of FIG. 20A. When viewed along the arrow of FIG. 20A, the reflecting surface C of which one side has a length of 1 is visible, and the length of the diagonal of the reflecting surface C is $\sqrt{2}$. In the lower drawing of FIG. 20A, the points d and e overlap the point c. Also, the plane ade is the same as the plane ade shown in FIG. 19.

As shown in FIG. 20A, the plane ade is a plane parallel to the tangent plane P. The angle between the line segment bc and the tangent plane P is $\phi$, and the angle between the line segment ab and the tangent plane P is $\theta$.

Here, when it is taken that the reflected light LR3 is emitted in a perpendicular direction from the reflecting surface C at the point c as shown in FIG. 20B, the reflected light LR2 that is incident on the reflecting surface C is incident at the angle β on the reflecting surface C shown in FIG. 20A. The angle γ between the reflected light LR1 and the tangent plane P is γ+β=ϕ, and ϕ is about 54.7° as described with reference to FIG. 19. Accordingly, γ is determined by γ=2×ϕ−90°≈19.4°. Because β=θ, then β≈35.3°.

FIGS. 21A to 21C are for describing the difference between the dihedral corner reflector of the image-forming element of the embodiment and a well-known corner cube reflector.

FIGS. 21A to 21C show figures corresponding to the corner cube reflector CCR described with reference to FIGS. 19 and 20A. In FIGS. 21A to 21C, the points a, b, d, and e correspond to the points a, b, d, and e of the corner cube reflector CCR associated with FIGS. 19 and 20A. In FIGS. 21A to 21C, the points f, g, and h are added in addition to the points a, b, d, and e. The square having the points a, h, d, and b as vertices corresponds to the second reflecting surface 32 described with reference to FIGS. 4A and 4B. The square having the points a, b, e, and g as vertices corresponds to the first reflecting surface 31 described with reference to FIGS. 4A and 4B. The square having the points b, e, f, and d as vertices corresponds to the removed reflecting surface of the dihedral corner reflector 30, and corresponds to the reflecting surface C of the corner cube reflector CCR associated with FIGS. 19 and 20A.

In FIG. 21A, the square bdfe is shown by horizontal hatching. The triangles adb and abe are shown by vertical hatching. In FIG. 21B, the location corresponding to the square bdfe of FIG. 21A is illustrated by a thick solid line. That is, the square bdfe corresponds to the third reflecting surface of the corner cube reflector.

FIG. 21C shows a portion of FIG. 21B, a light ray, and reflected light of the light ray.

The case will now be considered in which the third reflecting surface exists in the square bdfe shown in FIGS. 21A and 21B.

As shown in FIG. 21C, when a light ray from the positive Z-axis side is incident on the square bdfe shown in FIGS. 21A and 21B, the incident light at the point f is reflected at the angle β with respect to the square bdfe. As described with reference to FIG. 20B, β=θ≈35.3°, and tan β=1/√2. Accordingly, when the reflecting surface exists at the square bdfe, the reflected light is incident on one of the triangle adb or the triangle abe, which have vertical hatching. Then, the light is re-reflected by one of the reflecting surface corresponding to the square abeg or the reflecting surface corresponding to the square ahdb and emitted toward the positive Z-axis side. Thus, it can be said that the dihedral corner reflector of the image-forming element of the embodiment is different from the corner cube reflector.

As described above, the image-forming element of the embodiment can form a floating image at the first surface 11a side by the light ray emitted from the light source located at the first surface 11a side when referenced to the base member 12 being reflected twice by the dihedral corner reflector.

Effects of the image-forming element 10 of the embodiment will now be described.

In the image-forming element 10 of the embodiment, the angle of the dihedral corner reflector 30 with respect to the virtual plane P0 is set to be greater than 0° and less than 90°. Then, the angle of the dihedral corner reflector 30 with respect to the virtual plane P0 is set to be different according to the positions of the dihedral corner reflectors 30 arranged in the Y-axis direction, is set to increase away from the dihedral corner reflector 30 of the reference position in one direction of the Y-axis direction, and is set to decrease away from the dihedral corner reflector 30 of the reference position in the other direction of the Y-axis direction. By such a setting, a floating image can be formed at the first surface 11a side by twice-reflecting the light rays from the first surface 11a side when referenced to the base member 12.

In the image-forming element 10 of the embodiment, by appropriately setting the angles of the dihedral corner reflector 30 with respect to the virtual plane P0, the light source can be located at any position at the first surface 11a side referenced to the base member 12, and the floating image can be formed at any desired position at the first surface 11a side that is different from the position of the light source.

As described in the first to fourth modifications, as long as the angles of the dihedral corner reflectors 30 with respect to the virtual plane P0 can be appropriately set, an image-forming element having an optimal shape can be realized by forming a reflector array of any shape at the base member. Therefore, a base member having any shape can be appropriately selected and applied according to the size of image-forming element, storage location, storage method, etc., and it is easier to downscale, simplify the structure of the device, etc.

As described in the fifth modification, the shapes of the first and second reflecting surfaces when viewed in front-view are not limited to square, and an image-forming element in which the luminance of the floating image is increased can be realized by using rectangles. Also, a floating image having a higher luminance can be obtained by optimally setting the ratio of the spacing of the reflector rows 22 and the area of the reflecting surface.

Second Embodiment

Figure 22:
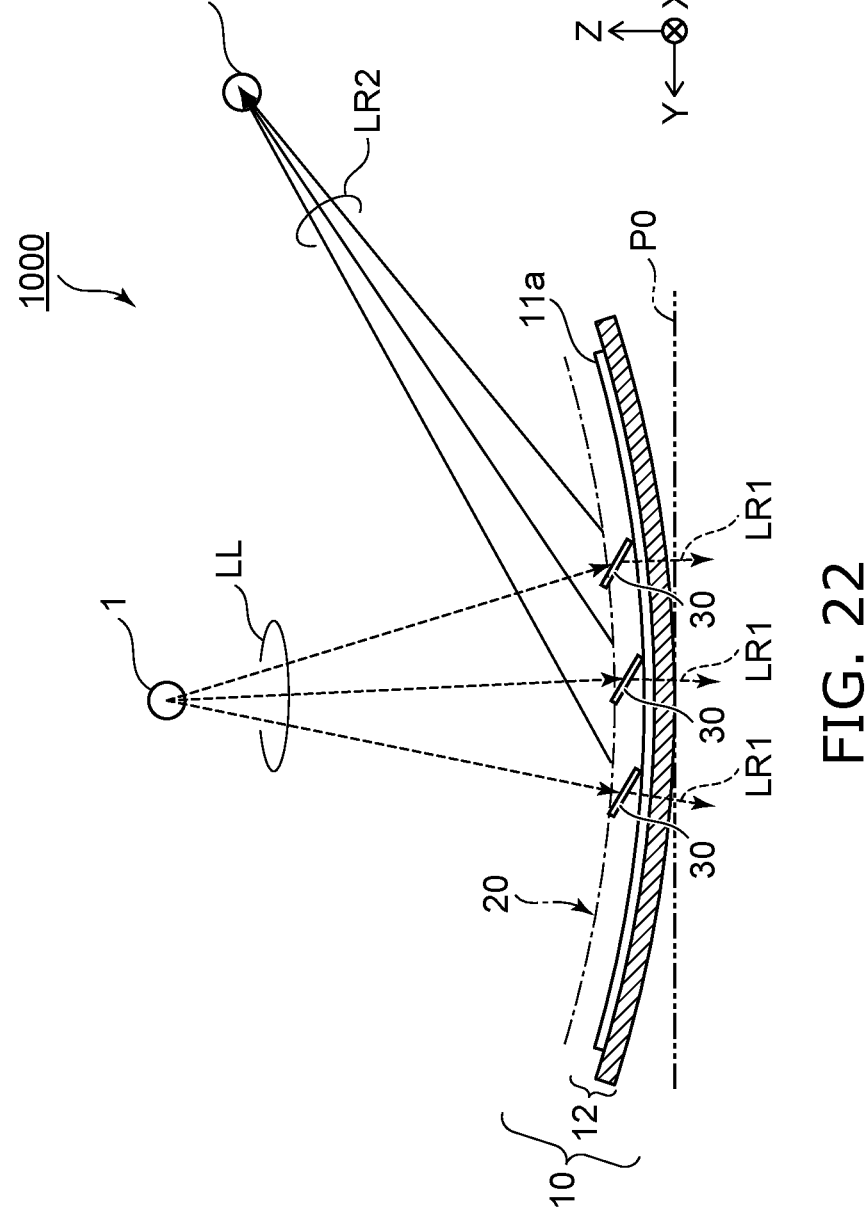
FIG. 22 is a schematic side view illustrating an image display device according to a second embodiment.

FIG. 22 is a schematic side view illustrating an image display device according to the embodiment.

As shown in FIG. 22, the image display device 1000 of the embodiment includes the image-forming element 10 and a light source 1. In FIG. 22, the image-forming element 10 includes the base member 12 and the reflector array 20, and the reflector array 20 is illustrated by the envelope of the vertices 34a of the dihedral corner reflectors 30 shown in FIG. 4B. The reflector array 20 of FIG. 22 has a simplified illustration of three dihedral corner reflectors 30 among many dihedral corner reflectors to show the reflection of the light rays incident on the reflector array 20. The light source 1 can be an image generation part, and the image generation part can include multiple light-emitting pixels and a drive circuit of the multiple light-emitting pixels. The image generation part is, for example, a micro LED array, a micro OLED display, a liquid crystal display panel, etc. By using such an image generation part as the light source 1, a video image, still image, or the like displayed by the image generation part can be formed in mid-air.

The image-forming element 10 of the first embodiment can be used as the image-forming element of the image display device 1000 of the embodiment. Image-forming elements that are applicable to the image display device 1000 may be appropriate combinations of the first to fifth modifications with the image-forming element of the first embodiment. Appropriate combinations of the first to fifth modifications with the image-forming element of the first embodiment may be used similarly in modifications of the second embodiment and image display devices of third and fourth embodiments described below.

The light source 1 is located at the first surface 11*a* side. The light source 1 is located directly above the reflector array 20. For example, the light source 1 radiates, on the reflector array 20, light rays including normal-direction components of the virtual plane P0. The virtual plane P0 is the same as that described with reference to FIG. 2. The virtual plane P0 is a plane parallel to a tangent plane contacting a portion of the circular arc of the first surface 11*a* at a point positioned furthest toward the negative Z-axis side. The distance between the light source 1 and the reflector array 20 is set to be less than the distance between the reflector array 20 and the center of the circular arc and is, for example, about ½ of the distance between the reflector array 20 and the center of the circular arc.

In the image display device 1000 of the embodiment, the light ray LL that is incident from the light source 1 is reflected twice by the dihedral corner reflector 30 and emitted toward the first surface 11*a* side. The reflected light LR2 that is emitted form s the floating image I at the first surface 11*a* side at a different position from the light source 1. Similarly to the first embodiment, the position at which the floating image I is formed is determined by the angles of the dihedral corner reflectors 30 with respect to the virtual plane P0.

In the image display device 1000 of the embodiment, the light ray LL that is incident from the light source 1 and becomes the reflected light LR1 reflected only once by the dihedral corner reflector 30 is not emitted toward the first surface 11*a* side, but escapes through the base member 12 and is emitted toward the second surface 11*b* side.

(Modifications)

Figure 23:
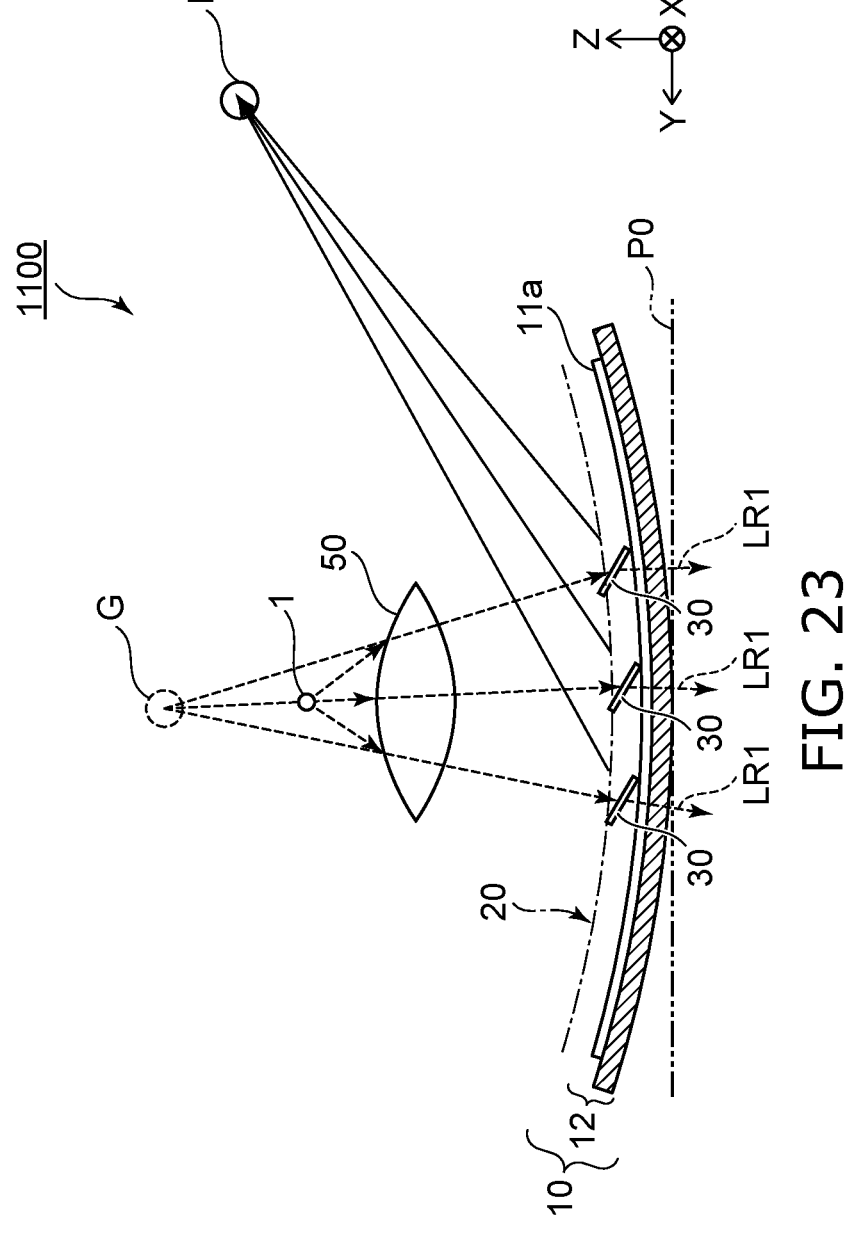
FIG. 23 is a schematic side view illustrating an image display device according to a modification of the second embodiment.

FIG. 23 is a schematic side view illustrating an image display device according to the modification.

As shown in FIG. 23, the image display device 1100 of the modification includes the image-forming element 10, the light source 1, and the reflector array 20, and further includes an optical element 50. The modification differs from the second embodiment in that the optical element 50 is included; otherwise, the modification is the same as the second embodiment. The same components are marked with the same reference numerals, and a detailed description is omitted.

The optical element 50 is located between the light source 1 and the image-forming element 10. In the example, the optical element 50 is a convex lens. The position of the light source 1 when the convex lens used as the optical element 50 is not included is shown as the position of a virtual image Gin FIG. 23.

According to the modification, the focal length of the convex lens used as the optical element 50 is set to be less than the distance between the optical element 50 and the virtual image position. Therefore, by providing the optical element 50 between the light source 1 and the image-forming element 10, the distance between the light source 1 and the image-forming element 10 can be reduced. The optical element is not limited to a convex lens; the light source 1 can be located at the desired position by using a reflective mirror or the like and by combining with lenses.

An operation of the image display device 1000 of the embodiment will now be described.

Figure 24A:
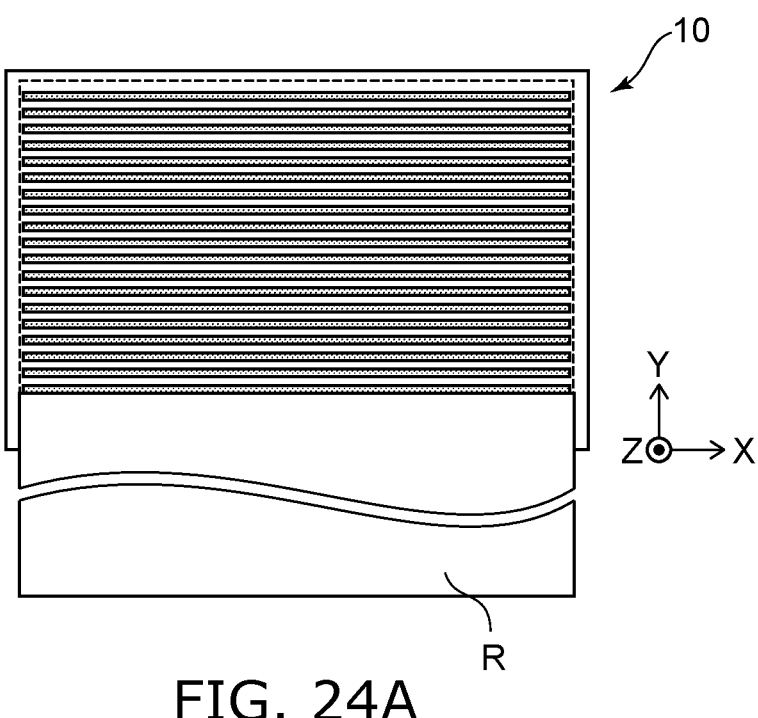
FIG. 24A is a schematic plan view for describing an operation of the image display device of the second embodiment.

FIG. 24A is a schematic plan view for describing the operation of the image display device of the embodiment.

Figure 24B:
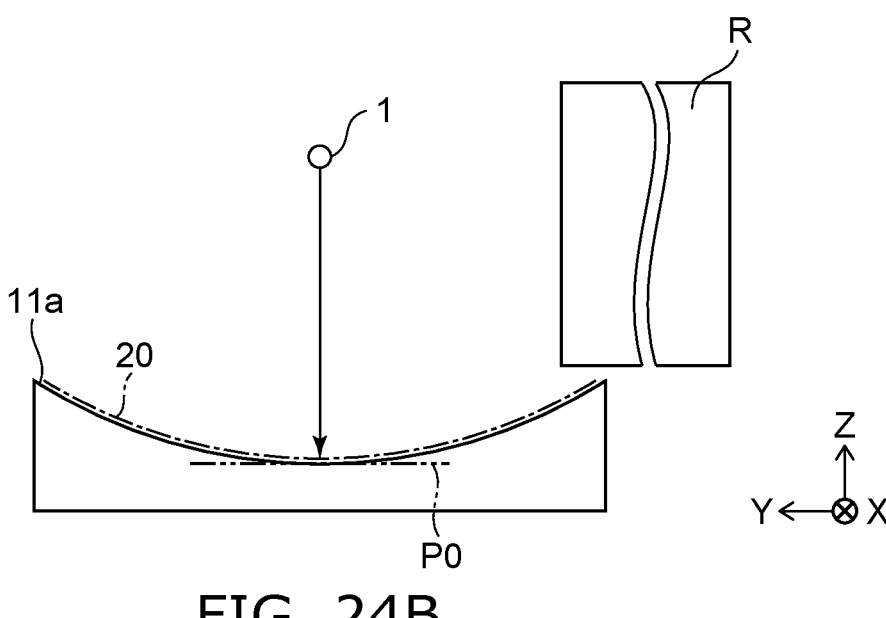
FIG. 24B is a schematic side view for describing the operation of the image display device of the second embodiment.

FIG. 24B is a schematic side view for describing the operation of the image display device of the embodiment.

In the image display device 1000 of the embodiment, the image-forming element 10 of the first embodiment is used; therefore, the image-forming element 10 operates as described above.

According to the embodiment, the light rays that are incident on the image-forming element 10 from the light source 1 located at the first surface 11*a* side are reflected twice by the dihedral corner reflectors, are emitted toward the first surface 11*a* side, and form a floating image.

As shown in FIGS. 24A and 24B, when the light rays incident on the image-forming element 10 from the light source 1 are reflected twice by the dihedral corner reflectors, the light rays form a floating image in a region R that is shifted in the Y-axis direction at the same side as the light source 1 when referenced to the base member 12. The length in the Z-axis direction and the length in the Y-axis direction of the region R are determined by adjusting or setting the position of the light source 1 and the angles with respect to the virtual plane P0 of the dihedral corner reflectors included in the reflector array 20. The position of the floating image can be a position in the Y-axis direction that is sufficiently separated from the position in the Y-axis direction of the light source 1, and can be a sufficiently higher position or a sufficiently lower position than the position in the Z-axis direction of the light source 1.

In the example, similarly to the first embodiment, the virtual plane P0 is taken as a tangent plane at the lowest position in the Z-axis direction of the portion of the circular arc of the first surface 11*a* and the reflector array 20. Similarly to the first embodiment, the lengths in the Z-axis direction of the two Y-axis direction end portions of the image-forming element 10 are set to be substantially equal. The position of the virtual plane P0 is not limited to the position described above and may be arbitrary as long as the incident light rays are reflected twice by the dihedral corner reflectors and emitted toward the first surface 11*a* side.

Effects of the image display device 1000 of the embodiment will now be described.

The image display device 1000 of the embodiment includes the image-forming elements of the first embodiment and the first to fifth modifications described above, and therefore provides the effects described above. Namely, the floating image I can be formed at the first surface 11*a* side of the light source 1 is located, but at a different position from the light source 1.

Moreover, in the image display device 1000 of the embodiment, the light source 1 is arranged so that the reflected light reflected twice by the dihedral corner reflectors is emitted toward the first surface 11*a* side, and therefore can form a floating image in a space separated from the image-forming element and the light source 1.

In a conventional image display device using a corner cube reflector, the retroreflection of the corner cube reflector is utilized, and it is therefore necessary to embed a complex optical circuit to form an image at a different position from the light source. Therefore, attention has been called to the configuration of the image display device being complex, the device being larger, and higher costs being difficult to avoid.

Also, in a conventional image display device using a dihedral corner reflector, the dihedral corner reflector is utilized as a transmission-type image-forming element, and the dihedral corner reflector is located between the positions of the light source and the floating image; it is therefore difficult to make the device smaller. Therefore, an image-forming element that utilizes a reflection-type dihedral corner reflector is being investigated (see Patent Literature 1).

However, such an image-forming element that utilizes a dihedral corner reflector is problematic in that, due to the operation principle of the dihedral corner reflector, a false image is formed at the floating image side, and it is difficult to avoid false image formation.

Although image display devices in which a mid-air display is possible are being investigated in applications inside automobiles, it is problematic when a false image is displayed at a position other than the original location of the display, and a person other than the operator of the image display device can view the false image. Also, there may be cases where, due to the formation position of the false image, the operator may view the false image and undesirably operate according to the false image.

Also, in applications other than automobiles, when a mid-air display panel is utilized as an alternative to a non-contact operation panel, the formation of a false image at the operator side may cause misoperation, etc., and is an obstacle to full-fledged practical use.

When the mid-air display panel is applied to a financial terminal or the like, there may be a risk of confidential personal identification numbers being surreptitiously viewed, etc., if a false image is formed at a position other than the position viewed by the operator.

The image display device 1000 of the embodiment includes the image-forming element 10 that includes a reflector array in which the multiple reflector rows are arranged to have spacing interposed, and so the reflected light that forms false images escapes toward a different side from the side at which the floating image is formed. Therefore, when the image display device 1000 is applied to the vehicle interior of an automobile or another non-contact operation panel, the floating image can be formed in a space sufficiently separated from the position of the light source without forming a false image at the real image formation side. Therefore, a safe and secure non-contact operation panel that can display the necessary information can be realized without the device occupying space inside the automobile.

As shown in the image display device 1100 of the modification, further downsizing and image display devices of arbitrary shapes can be realized by combining with the optical element 50.

Third Embodiment

Figure 25:
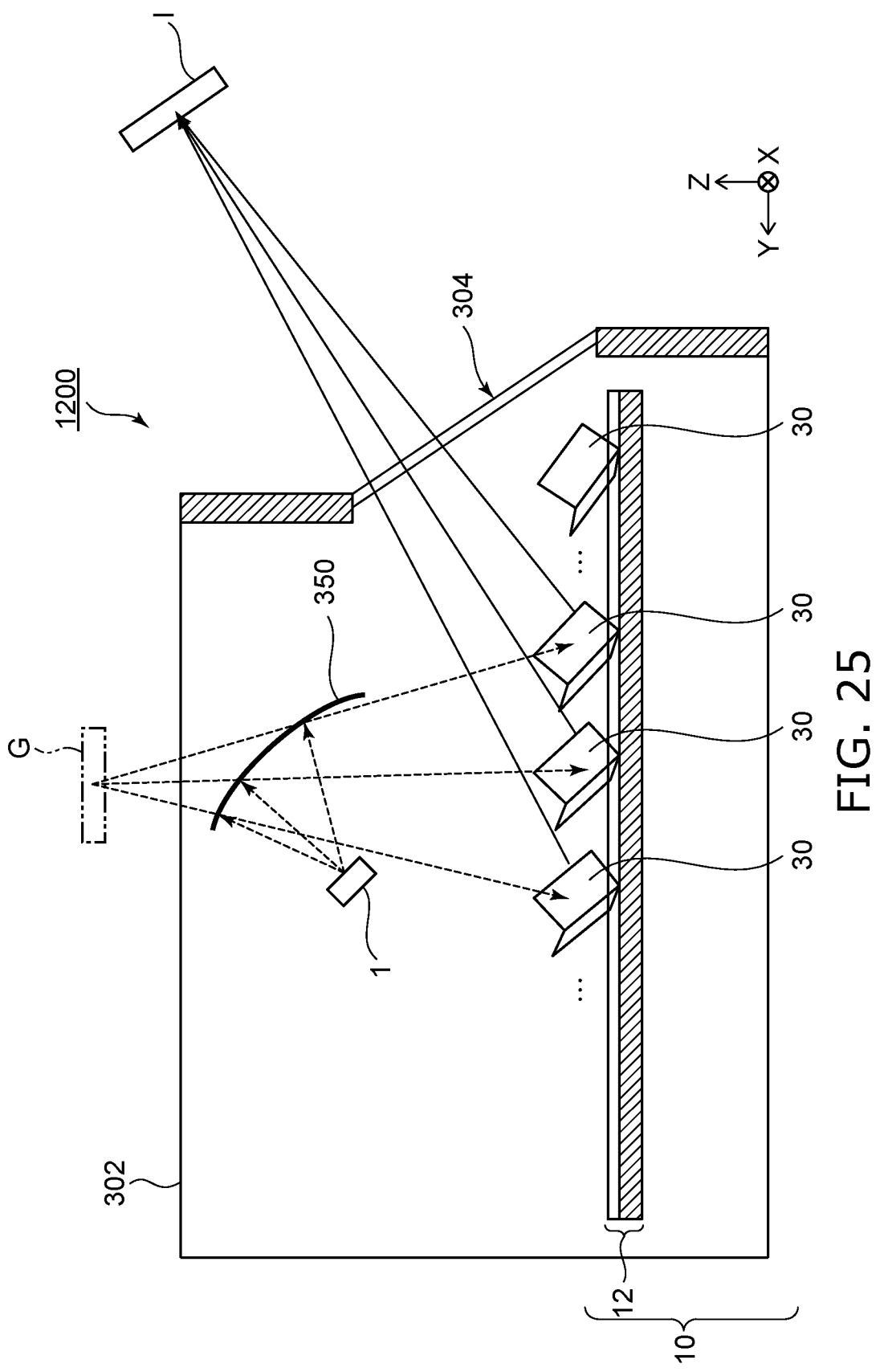
FIG. 25 is a schematic side view illustrating an image display device according to a third embodiment.

FIG. 25 is a schematic side view illustrating an image display device according to the embodiment.

As shown in FIG. 25, the image display device 1200 of the embodiment includes the image-forming element 10, the light source 1, and an optical element 350. The image display device 1200 further includes a housing 302.

The embodiment differs from the second embodiment and modifications of the second embodiment in that the optical element 350 that is different from that of the modification of the second embodiment is included, and the housing 302 that houses the image-forming element 10, the light source 1, and the optical element 350 is included. The same components are marked with the same reference numerals, and a detailed description is omitted as appropriate.

In the image display device 1200 of the embodiment, a reflective mirror is used as the optical element 350. The position of the light source when the optical element 350 is not included is shown as the position of the virtual image G in FIG. 25. According to the embodiment, by using the reflective mirror as the optical element 350, the optical paths of the light rays radiated by the light source 1 can be bent, so that storage is easy in the housing 302 which has a limited internal volume. By using a curved reflective mirror as the optical element 350, the virtual image G can be formed without the risk of chromatic aberration occurring. Other optical elements such as, for example, lenses, etc., may be used in addition to or instead of the reflective mirror.

In the image display device 1200 of the embodiment, the housing 302 that houses the image-forming element 10, the light source 1, and the optical element 350 is included, and the image-forming element 10, the light source 1, and the optical element 350 are covered with the housing. A window (a window member) 304 is located between the image-forming element 10 and the floating image I that is formable by the image-forming element. The floating image I that is formed by the reflected light emitted by the image-forming element 10 is formed via the window 304 located in the housing 302. The window 304 is formed of a light-transmitting material and is formed of, for example, a transparent resin, a colored resin, etc. It is favorable for the window 304 to be light-transmitting with a haze value of not more than 50%, and favorably not more than 5%.

Effects of the image display device 1200 of the embodiment will now be described.

The image display device 1200 of the embodiment provides effects similar to those of the second embodiment; furthermore, by including the housing 302, components such as the image-forming element 10, the light source 1, the optical element 350, etc., can be eliminated from the visual field of the user of the image display device 1200. Therefore, the user can be psychologically relieved of the state of being crowded with devices and can perceive the limited space to be more spacious. Also, the image-forming element 10, the light source 1, and the optical element 350 can be shielded from the outside by the housing 302, and the image-forming element 10, the light source 1, and the optical element 350 can be protected from the external environment such as condensation, dust, etc. Also, the effects of ambient light flare and the like on the floating image I can be avoided.

Fourth Embodiment

Figure 26:
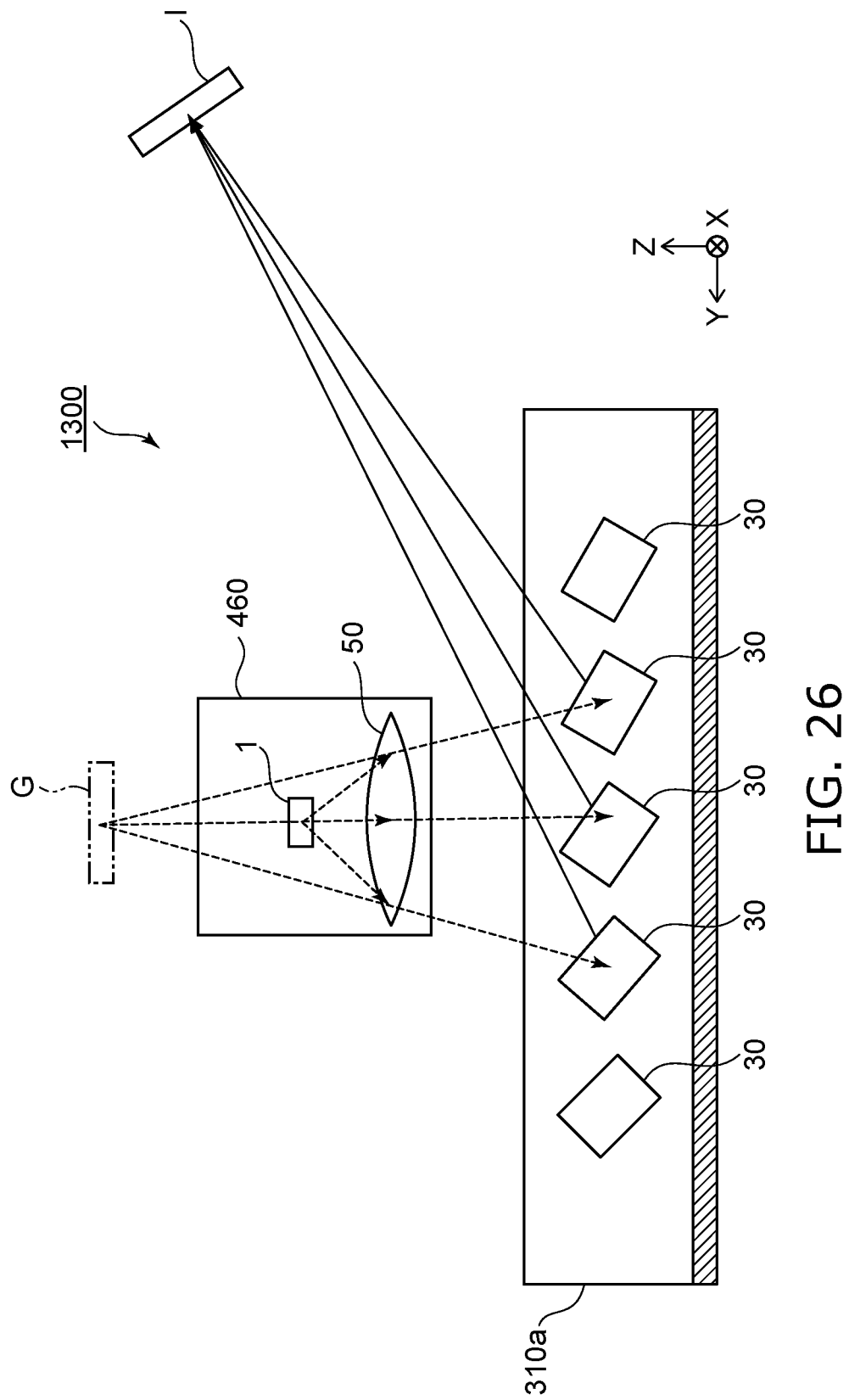
FIG. 26 is a schematic side view illustrating an image display device according to a fourth embodiment.

FIG. 26 is a schematic side view illustrating an image display device according to the embodiment.

As shown in FIG. 26, the image display device 1300 of the embodiment includes the image-forming element 310a and a light source device 460. The image-forming element 310a is the same as that of the modification of the first embodiment described with reference to FIG. 9B. The image-forming element is not limited thereto, and appropriate combinations of the first embodiment and modifications of the first embodiment are applicable.

According to the embodiment, the light source device 460 and the image-forming element 310a are provided separately, and the user uses any combination of the light source device 460 and the image-forming element 310a. The light source device 460 includes the light source 1 and the optical element 50, and although not illustrated, may include, for example, a power supply circuit driving the light source, a drive circuit, a memory circuit, etc.

According to the embodiment, the light source device 460 and the image-forming element 310a are provided separately, and the optical element 50 is embedded in the light source device 460. Therefore, the user of the image display device 1300 can house the light source device 460 and the image-forming element 310a as appropriate, and can take out the light source device 460 and the image-forming element 310*a* as necessary and utilize in an appropriate combination.

According to the embodiments described above, an image-forming element and an image display device having simple structures that do not easily display false images can be realized.

Although several embodiments of the invention are described hereinabove, these embodiments have been presented by way of example only, and are not intended to limit the scope of the inventions. These novel embodiments may be embodied in a variety of other forms, and various omissions, substitutions, and changes may be made without departing from the spirit of the inventions. Such embodiments and their modifications are within the scope and spirit of the inventions, and are within the scope of the inventions described in the claims and their equivalents. Also, the embodiments described above can be implemented in combination with each other.

What is claimed is:

1. An image-forming element comprising:
a base member including a first surface, and a second surface opposite the first surface; and
a reflector array located on the base member; wherein:
the reflector array comprises a plurality of reflector rows, each including a plurality of dihedral corner reflectors arranged along a first direction;
the plurality of reflector rows are arranged in a second direction crossing the first direction, the plurality of reflector rows being parallel to each other with a spacing therebetween;
each of the plurality of dihedral corner reflectors includes:
a first reflecting surface configured to reflect light from a first surface side, and
a second reflecting surface orthogonal to the first reflecting surface and configured to reflect a reflected light from the first reflecting surface toward the first surface side;
in each of the plurality of reflector rows, an angle between (i) a straight line at which the first and second reflecting surfaces cross, and (ii) a virtual plane including the first and second directions, is set to a value greater than 0° and less than 90°;
an angle between the first reflecting surface and the virtual plane is greater than 45° and less than 90°,
the plurality of reflector rows include a first reflector row of which the angle between the straight line and the virtual plane is set to a smallest value among the plurality of reflector rows,
for reflector rows other than the first reflector row, the angle between the straight line and the virtual plane is set to values that increase away from the first reflector row in one direction along the second direction.

2. The image-forming element according to claim 1, wherein:
in a plan view of a plane including the second direction and a third direction orthogonal to the first and second directions, the first surface of the base member is convex toward a second surface side;
the reflector array is located on the first surface; and
for each of the plurality of reflector rows, an angle between the straight line and the first surface is the same.

3. The image-forming element according to claim 1, wherein:
the base member is light-transmissive;

in a plan view of a plane including the second direction and a third direction orthogonal to the first and second directions, the second surface is convex from the first surface side;
the reflector array is located on the second surface; and
for each of the plurality of reflector rows, an angle between the straight line and the second surface is the same.

4. The image-forming element according to claim 1, wherein:
a light-absorbing member is located between adjacent ones of the reflector rows.

5. The image-forming element according to claim 1, wherein:
the base member comprises a light-absorbing member.

6. The image-forming element according to claim 1, further comprising:
a protective layer covering the reflector array.

7. An image display device comprising:
an image-forming element comprising:
a base member including a first surface, and a second surface opposite the first surface, and
a reflector array located on the base member; and
a light source configured to irradiate light on the image-forming element; wherein:
the reflector array comprises a plurality of reflector rows, each including a plurality of dihedral corner reflectors arranged along a first direction;
the plurality of reflector rows are arranged in a second direction crossing the first direction, the plurality of reflector rows being parallel to each other with a spacing therebetween;
each of the plurality of dihedral corner reflectors includes:
a first reflecting surface configured to reflect light from a first surface side, and
a second reflecting surface orthogonal to the first reflecting surface and configured to reflect a reflected light from the first reflecting surface toward the first surface side;
in each of the plurality of reflector rows, an angle between (i) a straight line at which the first and second reflecting surfaces cross, and (ii) a virtual plane including the first and second directions, is set to a value greater than 0° and less than 90°;
an angle between the first reflecting surface and the virtual plane is greater than 45° and less than 90°,
the plurality of reflector rows include a first reflector row of which the angle between the straight line and the virtual plane is set to a smallest value among the plurality of reflector rows,
for reflector rows other than the first reflector row, the angle between the straight line and the virtual plane is set to values that increase away from the first reflector row in one direction along the second direction;
the light source is located at the first surface side; and
each of the plurality of dihedral corner reflectors is arranged so that a portion of a light emitted from the light source and once-reflected by the first reflecting surface travels toward the second reflecting surface, and another portion of the reflected light travels toward the second surface side.

8. The image display device according to claim 7, wherein:
in a plan view of a plane including the second direction and a third direction orthogonal to the first and second directions, the first surface of the base member includes a circular arc that is convex toward the second surface side; and a distance between the light source and the reflector array is less than a distance from a center of the circular arc to the image-forming element.

9. The image display device according to claim 7, wherein:

in a plan view of a plane including the second direction and a third direction orthogonal to the first and second directions, the second surface of the base member includes a circular arc that is convex from the first surface side; and a distance between the light source and the reflector array is less than a distance from a center of the circular arc to the image-forming element.

10. The image display device according to claim 7, further comprising:

an optical element located between the light source and the image-forming element.

11. The image display device according to claim 7, further comprising:

a window member located between the image-forming element and a floating image that the image-forming element is configured to form.

12. The image display device according to claim 11, wherein:

the window member comprises a light-transmitting material that has a haze value that is equal to or less than 50%.

* * * * *